(12) United States Patent
Lee et al.

(10) Patent No.: US 10,859,842 B2
(45) Date of Patent: Dec. 8, 2020

(54) ELECTRONIC DEVICE

(71) Applicant: LG ELECTRONICS INC., Seoul (KR)

(72) Inventors: Minjong Lee, Seoul (KR); Sunggyu Koh, Seoul (KR); Jongkyu Ju, Seoul (KR); Jeonghwan Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/557,972

(22) Filed: Aug. 30, 2019

(65) Prior Publication Data

US 2020/0089009 A1 Mar. 19, 2020

(30) Foreign Application Priority Data

Aug. 9, 2019 (KR) .......................... 10-2019-0097353

(51) Int. Cl.
*G02B 27/01* (2006.01)
*G06F 1/16* (2006.01)

(52) U.S. Cl.
CPC ......... *G02B 27/0176* (2013.01); *G06F 1/163* (2013.01); *G02B 2027/0163* (2013.01); *G02B 2027/0178* (2013.01)

(58) Field of Classification Search
CPC ....... G06F 1/163; G02B 27/01; G02B 27/017; G02B 27/0176
See application file for complete search history.

(56) References Cited

U.S. PATENT DOCUMENTS

| | | | | |
|---|---|---|---|---|
| 5,305,244 A * | 4/1994 | Newman | ................. | G01R 1/025 704/E15.045 |
| 6,091,546 A * | 7/2000 | Spitzer | ................. | G02B 27/017 359/618 |
| 6,747,611 B1 * | 6/2004 | Budd | ................. | G02B 27/0172 345/7 |
| 6,762,885 B1 * | 7/2004 | Ogasawara | ........ | G02B 27/0176 345/8 |
| 7,969,383 B2 * | 6/2011 | Eberl | ................... | G05D 1/0038 345/7 |

(Continued)

*Primary Examiner* — Adrian S Wilson
(74) *Attorney, Agent, or Firm* — Lee, Hong, Degerman, Kang & Waimey PC

(57) ABSTRACT

In an electronic device connected to an external device and a cable, an electronic device comprising a driving unit including an image source panel configured to form image light, a display unit configured to make the image light formed by the driving unit visible to a user, and a frame provided with the driving unit and the display unit, wherein the frame includes a front frame configured to locate the display unit to be seen by the user, a pair of side frames connected to left and right sides of the front frame, respectively, and a port formed at an outer side of at least one point on which the side frame and the front frame are connected so that a cable for transferring data or power from an external device may be attached or detached, and the side frame includes a support unit configured to support a head, and a connection unit configured to connect the support unit and the front frame and having a step recessed inward from the support unit to secure a space for a connector of a cable is provided to minimize the interference problem of the cable and to implement a light and simple design.

10 Claims, 21 Drawing Sheets

(56) References Cited

U.S. PATENT DOCUMENTS

| | | |
|---|---|---|
| 9,703,103 B2 | 7/2017 | Araki et al. |
| 10,261,542 B1 | 4/2019 | Trail |
| 2012/0188149 A1* | 7/2012 | Yamada ............... G02B 27/017 |
| | | 345/8 |
| 2012/0293935 A1* | 11/2012 | Sherlock ............... G06F 1/1666 |
| | | 361/679.03 |
| 2015/0261015 A1* | 9/2015 | Han ................... G02B 27/0176 |
| | | 351/158 |
| 2015/0268475 A1* | 9/2015 | Lee ................... G02B 27/0176 |
| | | 345/8 |
| 2015/0378171 A1* | 12/2015 | Lee ................... G02B 27/0149 |
| | | 351/109 |
| 2016/0070110 A1* | 3/2016 | Ushakov ................ H04M 1/05 |
| | | 348/373 |
| 2016/0154240 A1* | 6/2016 | Lee ................... G02B 27/0093 |
| | | 345/8 |
| 2017/0102549 A1* | 4/2017 | Lee ................... G02B 27/0172 |
| 2018/0203239 A1* | 7/2018 | Lee ....................... G02C 11/10 |
| 2018/0210561 A1* | 7/2018 | Shigemori ............ G06F 3/0308 |
| 2018/0321497 A1* | 11/2018 | Yu ........................... G06F 1/203 |
| 2019/0056601 A1* | 2/2019 | Lee ...................... G02B 27/017 |
| 2019/0204606 A1* | 7/2019 | Yang ..................... H04R 1/345 |
| 2020/0088997 A1* | 3/2020 | Lee ................... G02B 27/0172 |
| 2020/0159028 A1* | 5/2020 | Araki ..................... G02B 27/02 |

\* cited by examiner

ELECTRONIC DEVICE

CROSS-REFERENCE TO RELATED APPLICATION

Pursuant to 35 U.S.C. § 119(a), this application claims the benefit of earlier filing date and right of priority to Korean Patent Application No. 10-2019-0097353, filed on Aug. 9, 2019, the contents of which are hereby incorporated by reference herein in its entirety.

BACKGROUND OF THE INVENTION

Field of the Invention

The present invention relates to an electronic device and, more particularly, to an electronic device used for Virtual Reality (VR), Augmented Reality (AR), and Mixed Reality (MR).

Related Art

Virtual reality (VR) refers to a special environment or situation generated by man-made technology using computer and other devices, which is similar but not exactly equal to the real world.

Augmented reality (AR) refers to the technology that makes a virtual object or information interwoven with the real world, making the virtual object or information perceived as if exists in reality.

Mixed reality (MR) or hybrid reality refers to combining of the real world with virtual objects or information, generating a new environment or new information. In particular, mixed reality refers to the experience that physical and virtual objects interact with each other in real time.

The virtual environment or situation in a sense of mixed reality stimulates the five senses of a user, allows the user to have a spatio-temporal experience similar to the one perceived from the real world, and thereby allows the user to freely cross the boundary between reality and imagination. Also, the user may not only get immersed in such an environment but also interact with objects implemented in the environment by manipulating or giving a command to the objects through an actual device.

Recently, research into the gear specialized in the technical field above is being actively conducted.

Such electronic devices (especially those used in augmented reality) emphasize the mobility as a portable device. That is, in electronic devices used in augmented reality, light weight, small volume, and comfortable fit are important factors. To meet those needs, electronic devices used in augmented reality attempt to achieve the small volume and light weight by minimizing the number of components and using as little battery capacity for power supply as possible.

In particular, the glasses type electronic device has advantages such as portability and weight, but it also has disadvantages in that power cannot be continuously supplied and performance is limited because it cannot mount all necessary components such as a processor and a sensor.

To alleviate this problem, it can be selectively combined with an external device, such as a smart phone, to take advantage of the smart phone's power and data. The glasses type electronic device to which an external device can be combined may only have a frame for wearing, a control unit for forming image light, and a display unit for displaying image light to a user. At this time, the smart phone and the electronic device are connected by a cable. However, an external device such as a smart phone is generally implemented in a handheld manner, which causes inconvenience in that the cable is jammed.

As another improvement, a method of selectively coupling a head unit having a battery and an electronic component to a glasses type electronic device having a minimum configuration, and wearing the head unit integrally with the electronic device by band coupling or the like. Since the head unit can be selectively coupled, the glasses type electronic device combined with an external device can be used when the portability is required, and the head unit can be used only when necessary. However, when the head unit is coupled, the structure for fixing it to the user's head is provided separately. Accordingly, it is required to separate a member for fixing it to the user's head from the frame of the conventional glasses type electronic device.

SUMMARY OF THE INVENTION

The present invention provides an electronic device used for Virtual Reality (VR), Augmented Reality (AR), and Mixed Reality (MR).

An object of the present invention is to solve the problem of cable interference when an external device is coupled using a cable to a glasses type electronic device in which the external device may be selectively coupled.

Another object is to solve the inconvenience caused by the existing frame when coupling and fixing the head unit to the glasses type electronic device using a band or the like.

According to an aspect of the present invention to achieve the above or another object, an electronic device comprising a driving unit including an image source panel configured to form image light, a display unit configured to make the image light formed by the driving unit visible to a user, and a frame provided with the driving unit and the display unit, wherein the frame includes a front frame configured to locate the display unit to be seen by the user, a pair of side frames connected to left and right sides of the front frame, respectively, and a port formed at an outer side of at least one point on which the side frame and the front frame are connected so that a cable for transferring data or power from an external device may be attached or detached, and the side frame includes a support unit configured to support a head, and a connection unit configured to connect the support unit and the front frame and having a step recessed inward from the support unit to secure a space for a connector of a cable is provided.

Further, according to another aspect of the present invention, the electronic device further comprising a side frame magnet provided to the support unit and configured to generate mutual attraction with a magnet provided to the cable is provided.

Further, according to another aspect of the present invention, the electronic device in which the support unit and the connection unit are manufactured as separate pieces and hinge-coupled to pivot mutually is provided.

Further, according to another aspect of the present invention, the electronic device further comprising a hook unit to which the side frame and the front frame are provided detachably is provided.

Further, according to another aspect of the present invention, the electronic device in which a hook of the hook unit is formed in the side frame, and the connection unit includes a support end formed in a vertical direction, and a pair of parallel cantilevers formed extending in a horizontal direction from an upper side and a lower side of the support end, respectively, outer ends of which form the hook that is fastened to a hook groove of the front frame is provided.

Further, according to another aspect of the present invention, the electronic device further comprising a head unit selectively coupled to the front frame to seat on the head of the user when coupled and configured to form an electronic part is provided.

Further, according to another aspect of the present invention, the electronic device in which the head unit includes a support band surrounding the head to fix the head unit to the head, a support bracket connected with the support band to support a region of the head, and a main body connected with the support band to form the electronic part is provided.

Further, according to another aspect of the present invention, the electronic device further comprising a band magnet provided to the support band to generate mutual attraction with the magnet provided to the cable connecting the main body and the driving unit through the port is provided.

Further, according to another aspect of the present invention, the electronic device in which the support bracket includes a fastening unit configured to be fastened to the front frame, and the main body includes a memory and a power supply and is located corresponding to back of the user's head is provided.

Further, according to another aspect of the present invention, the electronic device in which the support unit includes a cable seating unit forming an open area of 'c' shape at an end of the connection unit side is provided.

DESCRIPTION OF EXEMPLARY EMBODIMENTS

Figure 1:
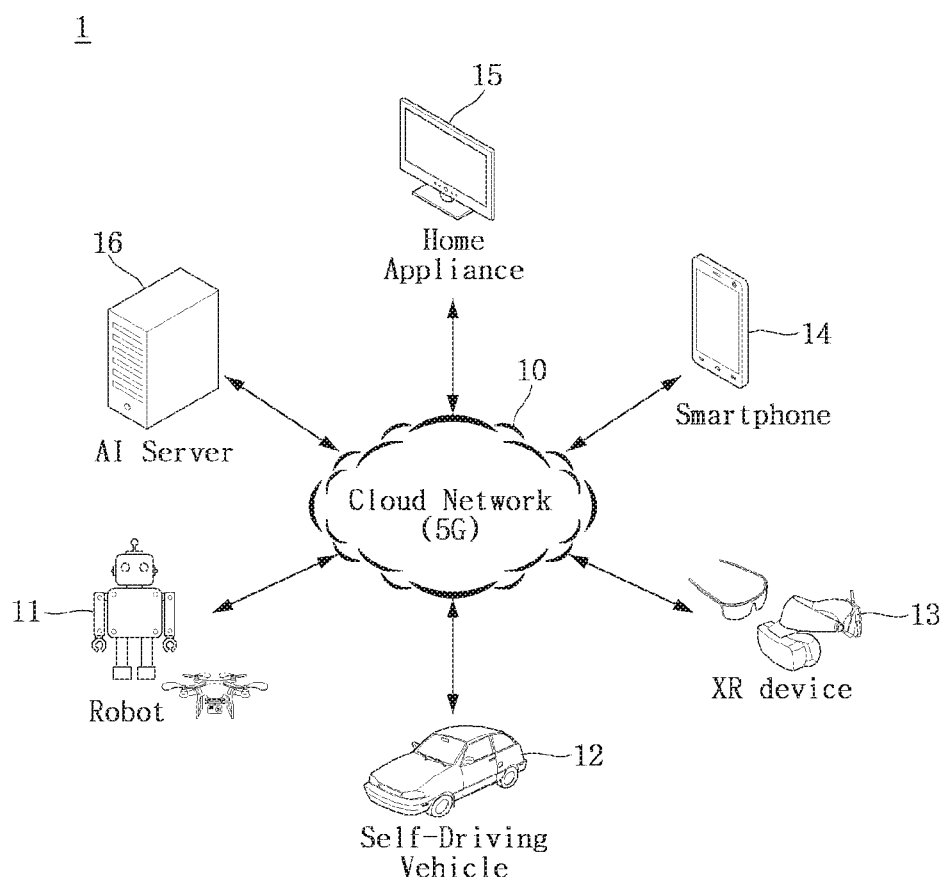
FIG. 1 illustrates one embodiment of an AI device.

In what follows, embodiments disclosed in this document will be described in detail with reference to appended drawings, where the same or similar constituent elements are given the same reference number irrespective of their drawing symbols, and repeated descriptions thereof will be omitted.

In describing an embodiment disclosed in the present specification, if a constituting element is said to be "connected" or "attached" to other constituting element, it should be understood that the former may be connected or attached directly to the other constituting element, but there may be a case in which another constituting element is present between the two constituting elements.

Also, in describing an embodiment disclosed in the present document, if it is determined that a detailed description of a related art incorporated herein unnecessarily obscure the gist of the embodiment, the detailed description thereof will be omitted. Also, it should be understood that the appended drawings are intended only to help understand embodiments disclosed in the present document and do not limit the technical principles and scope of the present invention; rather, it should be understood that the appended drawings include all of the modifications, equivalents or substitutes described by the technical principles and belonging to the technical scope of the present invention.

[5G Scenario]

The three main requirement areas in the 5G system are (1) enhanced Mobile Broadband (eMBB) area, (2) massive Machine Type Communication (mMTC) area, and (3) Ultra-Reliable and Low Latency Communication (URLLC) area.

Some use case may require a plurality of areas for optimization, but other use case may focus only one Key Performance Indicator (KPI). The 5G system supports various use cases in a flexible and reliable manner.

eMBB far surpasses the basic mobile Internet access, supports various interactive works, and covers media and entertainment applications in the cloud computing or augmented reality environment. Data is one of core driving elements of the 5G system, which is so abundant that for the first time, the voice-only service may be disappeared. In the 5G, voice is expected to be handled simply by an application program using a data connection provided by the communication system. Primary causes of increased volume of traffic are increase of content size and increase of the number of applications requiring a high data transfer rate. Streaming service (audio and video), interactive video, and mobile Internet connection will be more heavily used as more and more devices are connected to the Internet. These application programs require always-on connectivity to push real-time information and notifications to the user. Cloud-based storage and applications are growing rapidly in the mobile communication platforms, which may be applied to both of business and entertainment uses. And the cloud-based storage is a special use case that drives growth of uplink data transfer rate. The 5G is also used for cloud-based remote works and requires a much shorter end-to-end latency to ensure excellent user experience when a tactile interface is used. Entertainment, for example, cloud-based game and video streaming, is another core element that strengthens the requirement for mobile broadband capability. Entertainment is essential for smartphones and tablets in any place including a high mobility environment such as a train, car, and plane. Another use case is augmented reality for entertainment and information search. Here, augmented reality requires very low latency and instantaneous data transfer.

Also, one of highly expected 5G use cases is the function that connects embedded sensors seamlessly in every possible area, namely the use case based on mMTC. Up to 2020, the number of potential IoT devices is expected to reach 20.4 billion. Industrial IoT is one of key areas where the 5G performs a primary role to maintain infrastructure for smart city, asset tracking, smart utility, agriculture and security.

URLLC includes new services which may transform industry through ultra-reliable/ultra-low latency links, such as remote control of major infrastructure and self-driving cars. The level of reliability and latency are essential for smart grid control, industry automation, robotics, and drone control and coordination.

Next, a plurality of use cases will be described in more detail.

The 5G may complement Fiber-To-The-Home (FTTH) and cable-based broadband (or DOCSIS) as a means to provide a stream estimated to occupy hundreds of megabits per second up to gigabits per second. This fast speed is required not only for virtual reality and augmented reality but also for transferring video with a resolution more than 4K (6K, 8K or more). VR and AR applications almost always include immersive sports games. Specific application programs may require a special network configuration. For example, in the case of VR game, to minimize latency, game service providers may have to integrate a core server with the edge network service of the network operator.

Automobiles are expected to be a new important driving force for the 5G system together with various use cases of mobile communication for vehicles. For example, entertainment for passengers requires high capacity and high mobile broadband at the same time. This is so because users continue to expect a high-quality connection irrespective of their location and moving speed. Another use case in the automotive field is an augmented reality dashboard. The augmented reality dashboard overlays information, which is a perception result of an object in the dark and contains distance to the object and object motion, on what is seen through the front window. In a future, a wireless module enables communication among vehicles, information exchange between a vehicle and supporting infrastructure, and information exchange among a vehicle and other connected devices (for example, devices carried by a pedestrian). A safety system guides alternative courses of driving so that a driver may drive his or her vehicle more safely and to reduce the risk of accident. The next step will be a remotely driven or self-driven vehicle. This step requires highly reliable and highly fast communication between different self-driving vehicles and between a self-driving vehicle and infrastructure. In the future, it is expected that a self-driving vehicle takes care of all of the driving activities while a human driver focuses on dealing with an abnormal driving situation that the self-driving vehicle is unable to recognize. Technical requirements of a self-driving vehicle demand ultra-low latency and ultra-fast reliability up to the level that traffic safety may not be reached by human drivers.

The smart city and smart home, which are regarded as essential to realize a smart society, will be embedded into a high-density wireless sensor network. Distributed networks comprising intelligent sensors may identify conditions for cost-efficient and energy-efficient conditions for maintaining cities and homes. A similar configuration may be applied for each home. Temperature sensors, window and heating controllers, anti-theft alarm devices, and home appliances will be all connected wirelessly. Many of these sensors typified with a low data transfer rate, low power, and low cost. However, for example, real-time HD video may require specific types of devices for the purpose of surveillance.

As consumption and distribution of energy including heat or gas is being highly distributed, automated control of a distributed sensor network is required. A smart grid collects information and interconnect sensors by using digital information and communication technologies so that the distributed sensor network operates according to the collected information. Since the information may include behaviors of energy suppliers and consumers, the smart grid may help improving distribution of fuels such as electricity in terms of efficiency, reliability, economics, production sustainability, and automation. The smart grid may be regarded as a different type of sensor network with a low latency.

The health-care sector has many application programs that may benefit from mobile communication. A communication system may support telemedicine providing a clinical care from a distance. Telemedicine may help reduce barriers to distance and improve access to medical services that are not readily available in remote rural areas. It may also be used to save lives in critical medical and emergency situations. A wireless sensor network based on mobile communication may provide remote monitoring and sensors for parameters such as the heart rate and blood pressure.

Wireless and mobile communication are becoming increasingly important for industrial applications. Cable wiring requires high installation and maintenance costs. Therefore, replacement of cables with reconfigurable wireless links is an attractive opportunity for many industrial applications. However, to exploit the opportunity, the wireless connection is required to function with a latency similar to that in the cable connection, to be reliable and of large capacity, and to be managed in a simple manner. Low latency and very low error probability are new requirements that lead to the introduction of the 5G system.

Logistics and freight tracking are important use cases of mobile communication, which require tracking of an inventory and packages from any place by using location-based information system. The use of logistics and freight tracking typically requires a low data rate but requires large-scale and reliable location information.

The present invention to be described below may be implemented by combining or modifying the respective embodiments to satisfy the aforementioned requirements of the 5G system.

FIG. 1 illustrates one embodiment of an AI device.

Referring to FIG. 1, in the AI system, at least one or more of an AI server 16, robot 11, self-driving vehicle 12, XR device 13, smartphone 14, or home appliance 15 are connected to a cloud network 10. Here, the robot 11, self-driving vehicle 12, XR device 13, smartphone 14, or home appliance 15 to which the AI technology has been applied may be referred to as an AI device (11 to 15).

The cloud network 10 may comprise part of the cloud computing infrastructure or refer to a network existing in the cloud computing infrastructure. Here, the cloud network 10 may be constructed by using the 3G network, 4G or Long Term Evolution (LTE) network, or 5G network.

In other words, individual devices (11 to 16) constituting the AI system may be connected to each other through the cloud network 10. In particular, each individual device (11 to 16) may communicate with each other through the eNB but may communicate directly to each other without relying on the eNB.

The AI server 16 may include a server performing AI processing and a server performing computations on big data.

The AI server 16 may be connected to at least one or more of the robot 11, self-driving vehicle 12, XR device 13, smartphone 14, or home appliance 15, which are AI devices constituting the AI system, through the cloud network 10 and may help at least part of AI processing conducted in the connected AI devices (11 to 15).

At this time, the AI server 16 may teach the artificial neural network according to a machine learning algorithm on behalf of the AI device (11 to 15), directly store the learning model, or transmit the learning model to the AI device (11 to 15).

At this time, the AI server 16 may receive input data from the AI device (11 to 15), infer a result value from the received input data by using the learning model, generate a response or control command based on the inferred result value, and transmit the generated response or control command to the AI device (11 to 15).

Similarly, the AI device (11 to 15) may infer a result value from the input data by employing the learning model directly and generate a response or control command based on the inferred result value.

<AI+Robot>

By employing the AI technology, the robot 11 may be implemented as a guide robot, transport robot, cleaning robot, wearable robot, entertainment robot, pet robot, or unmanned flying robot.

The robot 11 may include a robot control module for controlling its motion, where the robot control module may correspond to a software module or a chip which implements the software module in the form of a hardware device.

The robot 11 may obtain status information of the robot 11, detect (recognize) the surroundings and objects, generate map data, determine a travel path and navigation plan, determine a response to user interaction, or determine motion by using sensor information obtained from various types of sensors.

Here, the robot 11 may use sensor information obtained from at least one or more sensors among lidar, radar, and camera to determine a travel path and navigation plan.

The robot 11 may perform the operations above by using a learning model built on at least one or more artificial neural networks. For example, the robot 11 may recognize the surroundings and objects by using the learning model and determine its motion by using the recognized surroundings or object information. Here, the learning model may be the one trained by the robot 11 itself or trained by an external device such as the AI server 16.

At this time, the robot 11 may perform the operation by generating a result by employing the learning model directly but also perform the operation by transmitting sensor information to an external device such as the AI server 16 and receiving a result generated accordingly.

The robot 11 may determine a travel path and navigation plan by using at least one or more of object information detected from the map data and sensor information or object information obtained from an external device and navigate according to the determined travel path and navigation plan by controlling its locomotion platform.

Map data may include object identification information about various objects disposed in the space in which the robot 11 navigates. For example, the map data may include object identification information about static objects such as wall and doors and movable objects such as a flowerpot and a desk. And the object identification information may include the name, type, distance, location, and so on.

Also, the robot 11 may perform the operation or navigate the space by controlling its locomotion platform based on the control/interaction of the user. At this time, the robot 11 may obtain intention information of the interaction due to the user's motion or voice command and perform an operation by determining a response based on the obtained intention information.

<AI+Autonomous Navigation>

By employing the AI technology, the self-driving vehicle 12 may be implemented as a mobile robot, unmanned ground vehicle, or unmanned aerial vehicle.

The self-driving vehicle 12 may include an autonomous navigation module for controlling its autonomous navigation function, where the autonomous navigation control module may correspond to a software module or a chip which implements the software module in the form of a hardware device. The autonomous navigation control module may be installed inside the self-driving vehicle 12 as a constituting element thereof or may be installed outside the self-driving vehicle 12 as a separate hardware component.

The self-driving vehicle 12 may obtain status information of the self-driving vehicle 12, detect (recognize) the surroundings and objects, generate map data, determine a travel path and navigation plan, or determine motion by using sensor information obtained from various types of sensors.

Like the robot 11, the self-driving vehicle 12 may use sensor information obtained from at least one or more sensors among lidar, radar, and camera to determine a travel path and navigation plan.

In particular, the self-driving vehicle 12 may recognize an occluded area or an area extending over a predetermined distance or objects located across the area by collecting sensor information from external devices or receive recognized information directly from the external devices.

The self-driving vehicle 12 may perform the operations above by using a learning model built on at least one or more artificial neural networks. For example, the self-driving vehicle 12 may recognize the surroundings and objects by using the learning model and determine its navigation route by using the recognized surroundings or object information. Here, the learning model may be the one trained by the self-driving vehicle 12 itself or trained by an external device such as the AI server 16.

At this time, the self-driving vehicle 12 may perform the operation by generating a result by employing the learning model directly but also perform the operation by transmitting sensor information to an external device such as the AI server 16 and receiving a result generated accordingly.

The self-driving vehicle 12 may determine a travel path and navigation plan by using at least one or more of object information detected from the map data and sensor information or object information obtained from an external device and navigate according to the determined travel path and navigation plan by controlling its driving platform.

Map data may include object identification information about various objects disposed in the space (for example, road) in which the self-driving vehicle 12 navigates. For example, the map data may include object identification information about static objects such as streetlights, rocks and buildings and movable objects such as vehicles and pedestrians. And the object identification information may include the name, type, distance, location, and so on.

Also, the self-driving vehicle 12 may perform the operation or navigate the space by controlling its driving platform based on the control/interaction of the user. At this time, the self-driving vehicle 12 may obtain intention information of the interaction due to the user's motion or voice command and perform an operation by determining a response based on the obtained intention information.

<AI+XR>

By employing the AI technology, the XR device 13 may be implemented as a Head-Mounted Display (HMD), Head-Up Display (HUD) installed at the vehicle, TV, mobile phone, smartphone, computer, wearable device, home appliance, digital signage, vehicle, robot with a fixed platform, or mobile robot.

The XR device 13 may obtain information about the surroundings or physical objects by generating position and attribute data about 3D points by analyzing 3D point cloud or image data acquired from various sensors or external devices and output objects in the form of XR objects by rendering the objects for display.

The XR device 13 may perform the operations above by using a learning model built on at least one or more artificial neural networks. For example, the XR device 13 may recognize physical objects from 3D point cloud or image data by using the learning model and provide information corresponding to the recognized physical objects. Here, the learning model may be the one trained by the XR device 13 itself or trained by an external device such as the AI server 16.

At this time, the XR device 13 may perform the operation by generating a result by employing the learning model directly but also perform the operation by transmitting sensor information to an external device such as the AI server 16 and receiving a result generated accordingly.

<AI+Robot+Autonomous Navigation>

By employing the AI and autonomous navigation technologies, the robot 11 may be implemented as a guide robot, transport robot, cleaning robot, wearable robot, entertainment robot, pet robot, or unmanned flying robot.

The robot 11 employing the AI and autonomous navigation technologies may correspond to a robot itself having an autonomous navigation function or a robot 11 interacting with the self-driving vehicle 12.

The robot 11 having the autonomous navigation function may correspond collectively to the devices which may move autonomously along a given path without control of the user or which may move by determining its path autonomously.

The robot 11 and the self-driving vehicle 12 having the autonomous navigation function may use a common sensing method to determine one or more of the travel path or navigation plan. For example, the robot 11 and the self-driving vehicle 12 having the autonomous navigation function may determine one or more of the travel path or navigation plan by using the information sensed through lidar, radar, and camera.

The robot 11 interacting with the self-driving vehicle 12, which exists separately from the self-driving vehicle 12, may be associated with the autonomous navigation function inside or outside the self-driving vehicle 12 or perform an operation associated with the user riding the self-driving vehicle 12.

At this time, the robot 11 interacting with the self-driving vehicle 12 may obtain sensor information in place of the self-driving vehicle 12 and provide the sensed information to the self-driving vehicle 12; or may control or assist the autonomous navigation function of the self-driving vehicle 12 by obtaining sensor information, generating information of the surroundings or object information, and providing the generated information to the self-driving vehicle 12.

Also, the robot 11 interacting with the self-driving vehicle 12 may control the function of the self-driving vehicle 12 by monitoring the user riding the self-driving vehicle 12 or through interaction with the user. For example, if it is determined that the driver is drowsy, the robot 11 may activate the autonomous navigation function of the self-driving vehicle 12 or assist the control of the driving platform of the self-driving vehicle 12. Here, the function of the self-driving vehicle 12 controlled by the robot 12 may include not only the autonomous navigation function but also the navigation system installed inside the self-driving vehicle 12 or the function provided by the audio system of the self-driving vehicle 12.

Also, the robot 11 interacting with the self-driving vehicle 12 may provide information to the self-driving vehicle 12 or assist functions of the self-driving vehicle 12 from the outside of the self-driving vehicle 12. For example, the robot 11 may provide traffic information including traffic sign information to the self-driving vehicle 12 like a smart traffic light or may automatically connect an electric charger to the charging port by interacting with the self-driving vehicle 12 like an automatic electric charger of the electric vehicle.

<AI+Robot+XR>

By employing the AI technology, the robot 11 may be implemented as a guide robot, transport robot, cleaning robot, wearable robot, entertainment robot, pet robot, or unmanned flying robot.

The robot 11 employing the XR technology may correspond to a robot which acts as a control/interaction target in the XR image. In this case, the robot 11 may be distinguished from the XR device 13, both of which may operate in conjunction with each other.

If the robot 11, which acts as a control/interaction target in the XR image, obtains sensor information from the sensors including a camera, the robot 11 or XR device 13 may generate an XR image based on the sensor information, and the XR device 13 may output the generated XR image. And the robot 11 may operate based on the control signal received through the XR device 13 or based on the interaction with the user.

For example, the user may check the XR image corresponding to the viewpoint of the robot 11 associated remotely through an external device such as the XR device 13, modify the navigation path of the robot 11 through interaction, control the operation or navigation of the robot 11, or check the information of nearby objects.

<AI+Autonomous Navigation+XR>

By employing the AI and XR technologies, the self-driving vehicle 12 may be implemented as a mobile robot, unmanned ground vehicle, or unmanned aerial vehicle.

The self-driving vehicle 12 employing the XR technology may correspond to a self-driving vehicle having a means for providing XR images or a self-driving vehicle which acts as a control/interaction target in the XR image. In particular, the self-driving vehicle 12 which acts as a control/interaction target in the XR image may be distinguished from the XR device 13, both of which may operate in conjunction with each other.

The self-driving vehicle 12 having a means for providing XR images may obtain sensor information from sensors including a camera and output XR images generated based on the sensor information obtained. For example, by displaying an XR image through HUD, the self-driving vehicle 12 may provide XR images corresponding to physical objects or image objects to the passenger.

At this time, if an XR object is output on the HUD, at least part of the XR object may be output so as to be overlapped with the physical object at which the passenger gazes. On the other hand, if an XR object is output on a display installed inside the self-driving vehicle 12, at least part of the XR object may be output so as to be overlapped with an image object. For example, the self-driving vehicle 12 may output XR objects corresponding to the objects such as roads, other vehicles, traffic lights, traffic signs, bicycles, pedestrians, and buildings.

If the self-driving vehicle 12, which acts as a control/interaction target in the XR image, obtains sensor information from the sensors including a camera, the self-driving vehicle 12 or XR device 13 may generate an XR image based on the sensor information, and the XR device 13 may output the generated XR image. And the self-driving vehicle 12 may operate based on the control signal received through an external device such as the XR device 13 or based on the interaction with the user.

[Extended Reality Technology]

eXtended Reality (XR) refers to all of Virtual Reality (VR), Augmented Reality (AR), and Mixed Reality (MR). The VR technology provides objects or backgrounds of the real world only in the form of CG images, AR technology provides virtual CG images overlaid on the physical object images, and MR technology employs computer graphics technology to mix and merge virtual objects with the real world.

MR technology is similar to AR technology in a sense that physical objects are displayed together with virtual objects. However, while virtual objects supplement physical objects in the AR, virtual and physical objects co-exist as equivalents in the MR.

The XR technology may be applied to Head-Mounted Display (HMD), Head-Up Display (HUD), mobile phone, tablet PC, laptop computer, desktop computer, TV, digital signage, and so on, where a device employing the XR technology may be called an XR device.

In what follows, an electronic device providing XR according to an embodiment of the present invention will be described.

Figure 2:
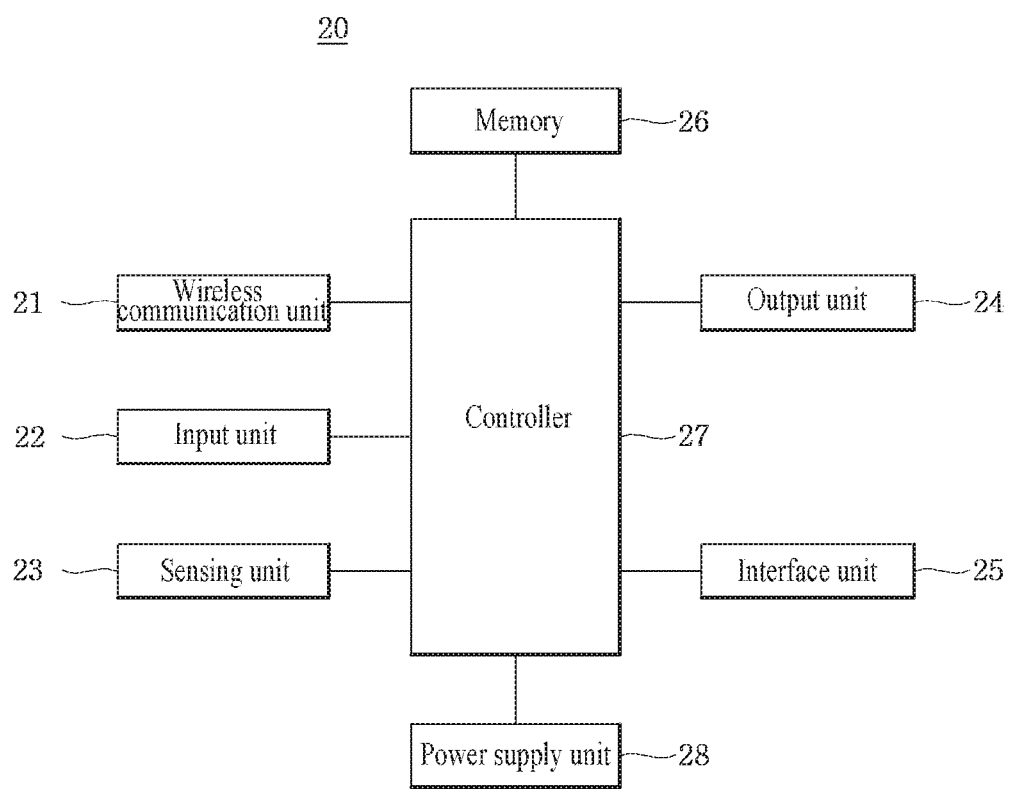
FIG. 2 is a block diagram illustrating the structure of an eXtended Reality (XR) electronic device according to one embodiment of the present invention.

FIG. 2 is a block diagram illustrating the structure of an XR electronic device 20 according to one embodiment of the present invention.

Referring to FIG. 2, the XR electronic device 20 may include a wireless communication unit 21, input unit 22, sensing unit 23, output unit 24, interface unit 25, memory 26, controller 27, and power supply unit 28. The constituting elements shown in FIG. 2 are not essential for implementing the electronic device 20, and therefore, the electronic device 20 described in this document may have more or fewer constituting elements than those listed above.

More specifically, among the constituting elements above, the wireless communication unit 21 may include one or more modules which enable wireless communication between the electronic device 20 and a wireless communication system, between the electronic device 20 and other electronic device, or between the electronic device 20 and an external server. Also, the wireless communication unit 21 may include one or more modules that connect the electronic device 20 to one or more networks.

The wireless communication unit 21 may include at least one of a broadcast receiving module, mobile communication module, wireless Internet module, short-range communication module, and location information module.

The input unit 22 may include a camera or image input unit for receiving an image signal, microphone or audio input unit for receiving an audio signal, and user input unit (for example, touch key) for receiving information from the user, and push key (for example, mechanical key). Voice data or image data collected by the input unit 22 may be analyzed and processed as a control command of the user.

The sensing unit 23 may include one or more sensors for sensing at least one of the surroundings of the electronic device 20 and user information.

For example, the sensing unit 23 may include at least one of a proximity sensor, illumination sensor, touch sensor, acceleration sensor, magnetic sensor, G-sensor, gyroscope sensor, motion sensor, RGB sensor, infrared (IR) sensor, finger scan sensor, ultrasonic sensor, optical sensor (for example, image capture means), microphone, battery gauge, environment sensor (for example, barometer, hygrometer, radiation detection sensor, heat detection sensor, and gas detection sensor), and chemical sensor (for example, electronic nose, health-care sensor, and biometric sensor). Meanwhile, the electronic device 20 disclosed in the present specification may utilize information collected from at least two or more sensors listed above.

The output unit 24 is intended to generate an output related to a visual, aural, or tactile stimulus and may include at least one of a display unit, sound output unit, haptic module, and optical output unit. The display unit may implement a touchscreen by forming a layered structure or being integrated with touch sensors. The touchscreen may not only function as a user input means for providing an input interface between the AR electronic device 20 and the user but also provide an output interface between the AR electronic device 20 and the user.

The interface unit 25 serves as a path to various types of external devices connected to the electronic device 20. Through the interface unit 25, the electronic device 20 may receive VR or AR content from an external device and perform interaction by exchanging various input signals, sensing signals, and data.

For example, the interface unit 25 may include at least one of a wired/wireless headset port, external charging port, wired/wireless data port, memory card port, port for connecting to a device equipped with an identification module, audio Input/Output (I/O) port, video I/O port, and earphone port.

Also, the memory 26 stores data supporting various functions of the electronic device 20. The memory 26 may store a plurality of application programs (or applications) executed in the electronic device 20; and data and commands for operation of the electronic device 20. Also, at least part of the application programs may be pre-installed at the electronic device 20 from the time of factory shipment for basic functions (for example, incoming and outgoing call function and message reception and transmission function) of the electronic device 20.

The controller 27 usually controls the overall operation of the electronic device 20 in addition to the operation related to the application program. The controller 27 may process signals, data, and information input or output through the constituting elements described above.

Also, the controller 27 may provide relevant information or process a function for the user by executing an application program stored in the memory 26 and controlling at least part of the constituting elements. Furthermore, the controller 27 may combine and operate at least two or more constituting elements among those constituting elements included in the electronic device 20 to operate the application program.

Also, the controller 27 may detect the motion of the electronic device 20 or user by using a gyroscope sensor, g-sensor, or motion sensor included in the sensing unit 23. Also, the controller 27 may detect an object approaching the vicinity of the electronic device 20 or user by using a proximity sensor, illumination sensor, magnetic sensor, infrared sensor, ultrasonic sensor, or light sensor included in the sensing unit 23. Besides, the controller 27 may detect the motion of the user through sensors installed at the controller operating in conjunction with the electronic device 20.

Also, the controller 27 may perform the operation (or function) of the electronic device 20 by using an application program stored in the memory 26.

The power supply unit 28 receives external or internal power under the control of the controller 27 and supplies the power to each and every constituting element included in the electronic device 20. The power supply unit 28 includes battery, which may be provided in a built-in or replaceable form.

At least part of the constituting elements described above may operate in conjunction with each other to implement the operation, control, or control method of the electronic device according to various embodiments described below. Also, the operation, control, or control method of the electronic device may be implemented on the electronic device by executing at least one application program stored in the memory 26.

In what follows, the electronic device according to one embodiment of the present invention will be described with reference to an example where the electronic device is applied to a Head Mounted Display (HMD). However, embodiments of the electronic device according to the present invention may include a mobile phone, smartphone, laptop computer, digital broadcast terminal, Personal Digital Assistant (PDA), Portable Multimedia Player (PMP), navigation terminal, slate PC, tablet PC, ultrabook, and wearable device. Wearable devices may include smart watch and contact lens in addition to the HMD.

Figure 3:
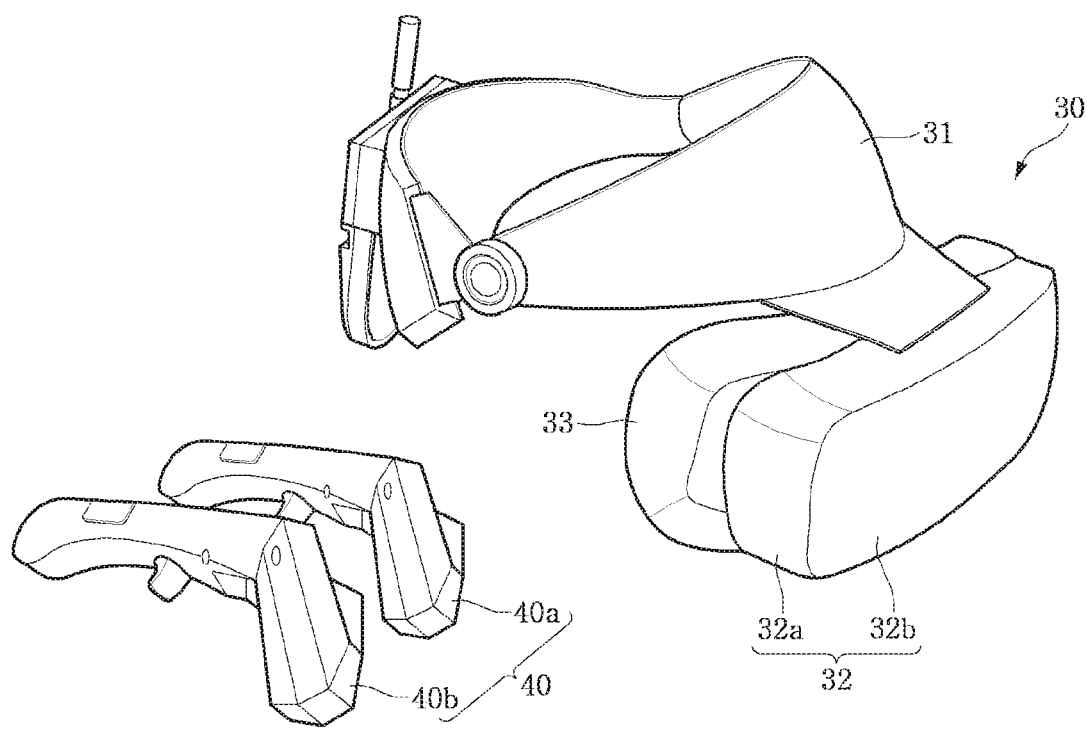
FIG. 3 is a perspective view of a VR electronic device according to one embodiment of the present invention.
Figure 4:
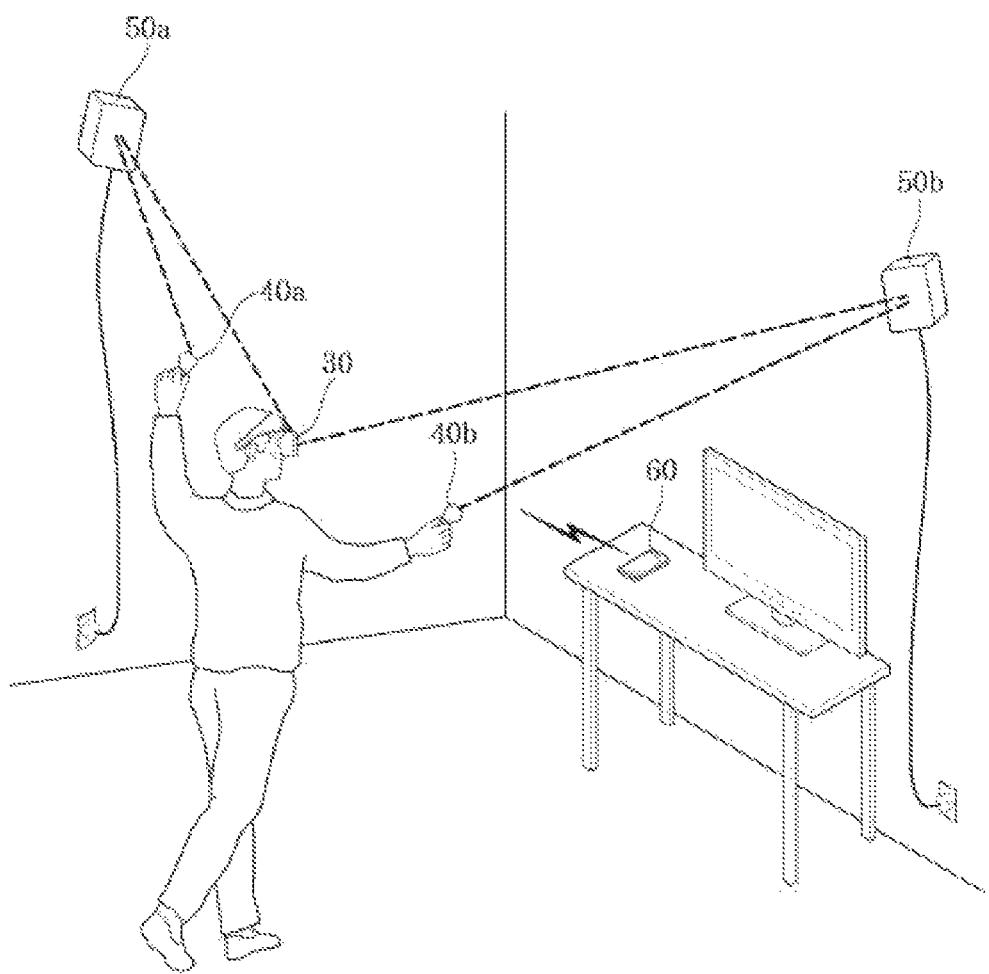
FIG. 4 illustrates a situation in which the VR electronic device of FIG. 3 is used.

FIG. 3 is a perspective view of a VR electronic device according to one embodiment of the present invention, and FIG. 4 illustrates a situation in which the VR electronic device of FIG. 3 is used.

Referring to the figures, a VR electronic device may include a box-type electronic device 30 mounted on the head of the user and a controller 40 (40a, 40b) that the user may grip and manipulate.

The electronic device 30 includes a head unit 31 worn and supported on the head and a display unit 32 being combined with the head unit 31 and displaying a virtual image or video in front of the user's eyes. Although the figure shows that the head unit 31 and display unit 32 are made as separate units and combined together, the display unit 32 may also be formed being integrated into the head unit 31.

The head unit 31 may assume a structure of enclosing the head of the user so as to disperse the weight of the display unit 32. And to accommodate different head sizes of users, the head unit 31 may provide a band of variable length.

The display unit 32 includes a cover unit 32a combined with the head unit 31 and a display unit 32b containing a display panel.

The cover unit 32a is also called a goggle frame and may have the shape of a tub as a whole. The cover unit 32a has a space formed therein, and an opening is formed at the front surface of the cover unit, the position of which corresponds to the eyeballs of the user.

The display unit 32b is installed on the front surface frame of the cover unit 32a and disposed at the position corresponding to the eyes of the user to display screen information (image or video). The screen information output on the display unit 32b includes not only VR content but also external images collected through an image capture means such as a camera.

And VR content displayed on the display unit 32b may be the content stored in the electronic device 30 itself or the content stored in an external device 60. For example, when the screen information is an image of the virtual world stored in the electronic device 30, the electronic device 30 may perform image processing and rendering to process the image of the virtual world and display image information generated from the image processing and rendering through the display unit 32b. On the other hand, in the case of a VR image stored in the external device 60, the external device 60 performs image processing and rendering and transmits image information generated from the image processing and rendering to the electronic device 30. Then the electronic device 30 may output 3D image information received from the external device 60 through the display unit 32b.

The display unit 32b may include a display panel installed at the front of the opening of the cover unit 32a, where the display panel may be an LCD or OLED panel. Similarly, the display unit 32b may be a display unit of a smartphone. In other words, the display unit 32b may have a specific structure in which a smartphone may be attached to or detached from the front of the cover unit 32a.

And an image capture means and various types of sensors may be installed at the front of the display unit 32.

The image capture means (for example, camera) is formed to capture (receive or input) the image of the front and may obtain a real world as seen by the user as an image. One image capture means may be installed at the center of the display unit 32b, or two or more of them may be installed at symmetric positions. When a plurality of image capture means are installed, a stereoscopic image may be obtained. An image combining an external image obtained from an image capture means with a virtual image may be displayed through the display unit 32b.

Various types of sensors may include a gyroscope sensor, motion sensor, or IR sensor. Various types of sensors will be described in more detail later.

At the rear of the display unit 32, a facial pad 33 may be installed. The facial pad 33 is made of cushioned material and is fit around the eyes of the user, providing comfortable fit to the face of the user. And the facial pad 33 is made of a flexible material with a shape corresponding to the front contour of the human face and may be fit to the facial shape of a different user, thereby blocking external light from entering the eyes.

In addition to the above, the electronic device 30 may be equipped with a user input unit operated to receive a control command, sound output unit, and controller. Descriptions of the aforementioned units are the same as give previously and will be omitted.

Also, a VR electronic device may be equipped with a controller 40 (40a, 40b) for controlling the operation related to VR images displayed through the box-type electronic device 30 as a peripheral device.

The controller 40 is provided in a way that the user may easily grip the controller 40 by using his or her both hands, and the outer surface of the controller 40 may have a touchpad (or trackpad) or buttons for receiving the user input.

The controller 40 may be used to control the screen output on the display unit 32b in conjunction with the electronic device 30. The controller 40 may include a grip unit that the user grips and a head unit extended from the grip unit and equipped with various sensors and a microprocessor. The grip unit may be shaped as a long vertical bar so that the user may easily grip the grip unit, and the head unit may be formed in a ring shape.

And the controller 40 may include an IR sensor, motion tracking sensor, microprocessor, and input unit. For example, IR sensor receives light emitted from a position tracking device 50 to be described later and tracks motion of the user. The motion tracking sensor may be formed as a single sensor suite integrating a 3-axis acceleration sensor, 3-axis gyroscope, and digital motion processor.

And the grip unit of the controller 40 may provide a user input unit. For example, the user input unit may include keys disposed inside the grip unit, touchpad (trackpad) equipped outside the grip unit, and trigger button.

Meanwhile, the controller 40 may perform a feedback operation corresponding to a signal received from the controller 27 of the electronic device 30. For example, the controller 40 may deliver a feedback signal to the user in the form of vibration, sound, or light.

Also, by operating the controller 40, the user may access an external environment image seen through the camera installed in the electronic device 30. In other words, even in the middle of experiencing the virtual world, the user may immediately check the surrounding environment by operating the controller 40 without taking off the electronic device 30.

Also, the VR electronic device may further include a position tracking device 50. The position tracking device 50 detects the position of the electronic device 30 or controller 40 by applying a position tracking technique, called lighthouse system, and helps tracking the 360-degree motion of the user.

The position tacking system may be implemented by installing one or more position tracking device 50 (50a, 50b) in a closed, specific space. A plurality of position tracking devices 50 may be installed at such positions that maximize the span of location-aware space, for example, at positions facing each other in the diagonal direction.

The electronic device 30 or controller 40 may receive light emitted from LED or laser emitter included in the plurality of position tracking devices 50 and determine the accurate position of the user in a closed, specific space based on a correlation between the time and position at which the corresponding light is received. To this purpose, each of the position tracking devices 50 may include an IR lamp and 2-axis motor, through which a signal is exchanged with the electronic device 30 or controller 40.

Also, the electronic device 30 may perform wired/wireless communication with an external device 60 (for example, PC, smartphone, or tablet PC). The electronic device 30 may receive images of the virtual world stored in the connected external device 60 and display the received image to the user.

Meanwhile, since the controller 40 and position tracking device 50 described above are not essential elements, they may be omitted in the embodiments of the present invention. For example, an input device installed in the electronic device 30 may replace the controller 40, and position information may be determined by itself from various sensors installed in the electronic device 30.

Figure 5:
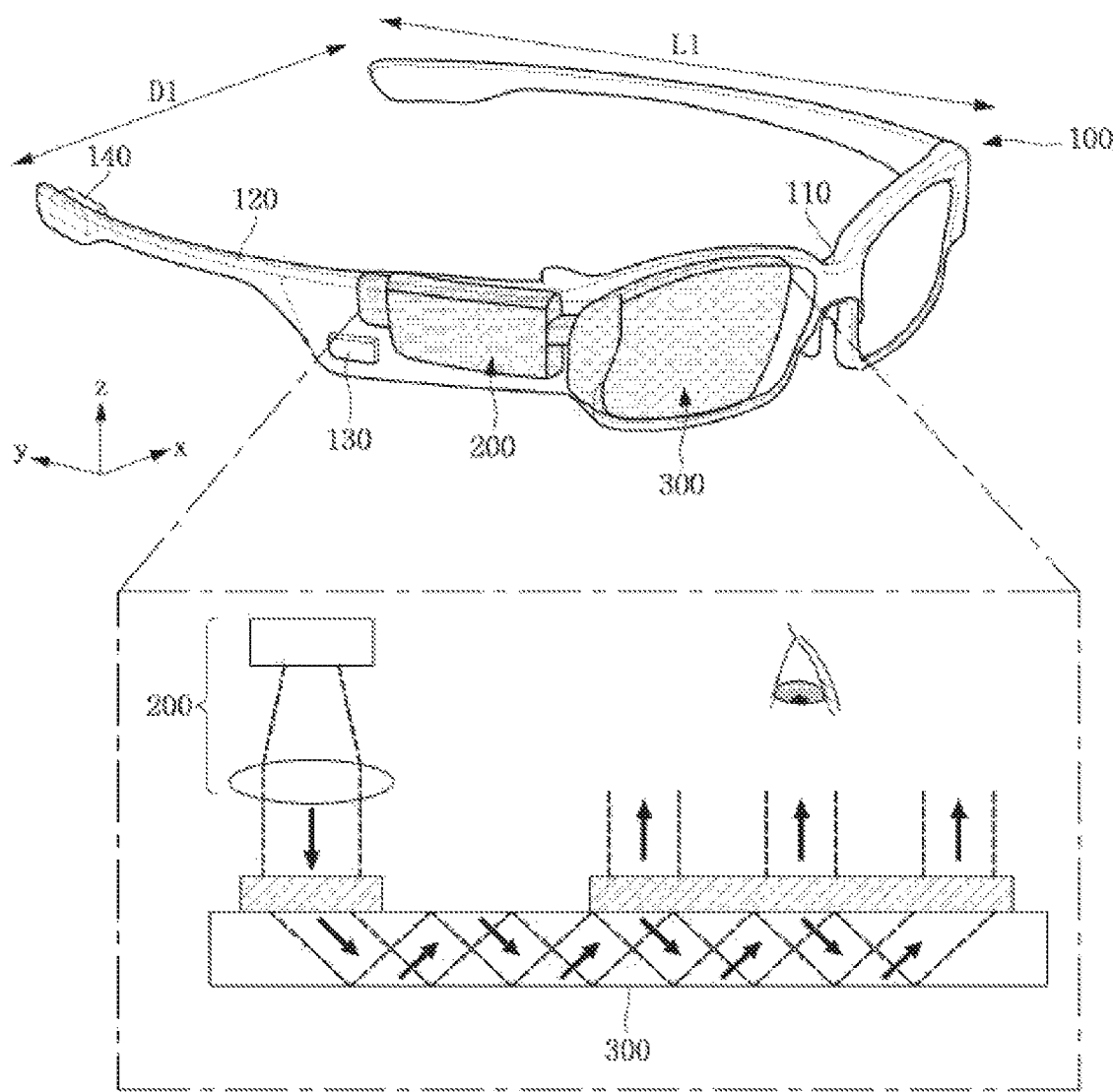
FIG. 5 is a perspective view of an AR electronic device according to one embodiment of the present invention.

FIG. 5 is a perspective view of an AR electronic device according to one embodiment of the present invention.

As shown in FIG. 5, the electronic device according to one embodiment of the present invention may include a frame 100, optical driving unit 200, and display unit 300.

The electronic device may be provided in the form of smart glasses. The glass-type electronic device may be shaped to be worn on the head of the user, for which the frame (case or housing) 100 may be used. The frame 100 may be made of a flexible material so that the user may wear the glass-type electronic device comfortably.

The frame 100 is supported on the head and provides a space in which various components are installed. As shown in the figure, electronic components such as the optical driving unit 200, user input unit 130, or sound output unit 140 may be installed in the frame 100. Also, lens that covers at least one of the left and right eyes may be installed in the frame 100 in a detachable manner.

As shown in the figure, the frame 100 may have a shape of glasses worn on the face of the user; however, the present invention is not limited to the specific shape and may have a shape such as goggles worn in close contact with the user's face.

The frame 100 may include a front frame 110 having at least one opening and one pair of side frames 120 parallel to each other and being extended in a first direction (y), which are intersected by the front frame 110.

The optical driving unit 200 is configured to control various electronic components installed in the electronic device.

The optical driving unit 200 may generate an image shown to the user or video comprising successive images. The optical driving unit 200 may include an image source panel that generates an image and a plurality of lenses that diffuse and converge light generated from the image source panel.

The optical driving unit 200 may be fixed to either of the two side frames 120. For example, the optical driving unit 200 may be fixed in the inner or outer surface of one side frame 120 or embedded inside one of side frames 120. Or the optical driving unit 200 may be fixed to the front frame 110 or provided separately from the electronic device.

The display unit 300 may be implemented in the form of a Head Mounted Display (HMD). HMD refers to a particular type of display device worn on the head and showing an image directly in front of eyes of the user. The display unit 300 may be disposed to correspond to at least one of left and right eyes so that images may be shown directly in front of the eye(s) of the user when the user wears the electronic device. The present figure illustrates a case where the display unit 300 is disposed at the position corresponding to the right eye of the user so that images may be shown before the right eye of the user.

The display unit 300 may be used so that an image generated by the optical driving unit 200 is shown to the user while the user visually recognizes the external environment. For example, the display unit 300 may project an image on the display area by using a prism.

And the display unit 300 may be formed to be transparent so that a projected image and a normal view (the visible part of the world as seen through the eyes of the user) in the front are shown at the same time. For example, the display unit 300 may be translucent and made of optical elements including glass.

And the display unit 300 may be fixed by being inserted into the opening included in the front frame 110 or may be fixed on the front surface 110 by being positioned on the rear surface of the opening (namely between the opening and the user's eye). Although the figure illustrates one example where the display unit 300 is fixed on the front surface 110 by being positioned on the rear surface of the rear surface, the display unit 300 may be disposed and fixed at various positions of the frame 100.

As shown in FIG. 5, the electronic device may operate so that if the optical driving unit 200 projects light about an image onto one side of the display unit 300, the light is emitted to the other side of the display unit, and the image generated by the optical driving unit 200 is shown to the user.

Accordingly, the user may see the image generated by the optical driving unit 200 while seeing the external environment simultaneously through the opening of the frame 100.

In other words, the image output through the display unit 300 may be seen by being overlapped with a normal view. By using the display characteristic described above, the electronic device may provide an AR experience which shows a virtual image overlapped with a real image or background as a single, interwoven image.

Figure 6:
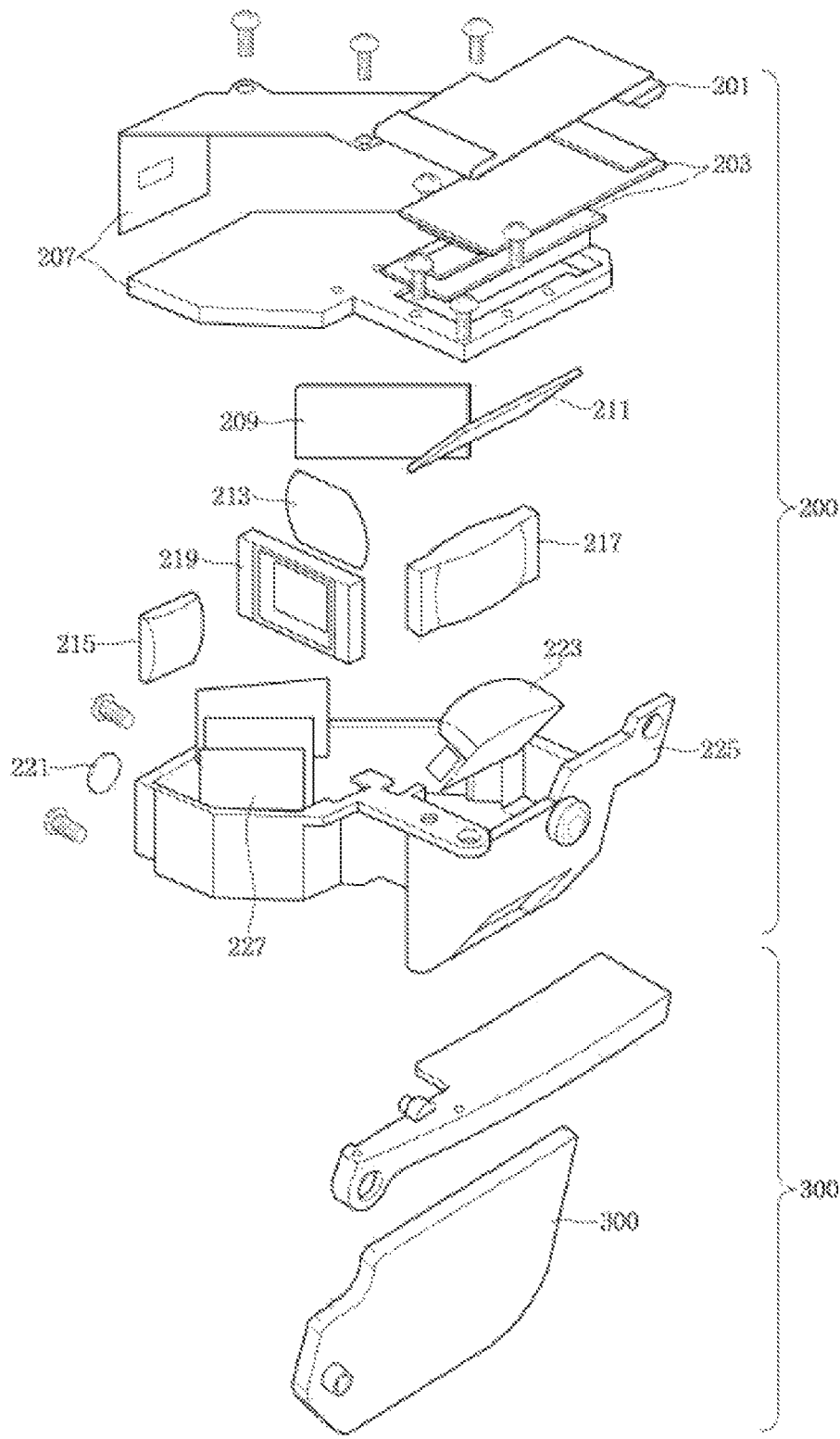
FIG. 6 is an exploded perspective view of a optical driving unit according to one embodiment of the present invention.

FIG. 6 is an exploded perspective view of a optical driving unit according to one embodiment of the present invention.

Referring to the figure, the optical driving unit 200 may include a first cover 207 and second cover 225 for protecting internal constituting elements and forming the external appearance of the optical driving unit 200, where, inside the first 207 and second 225 covers, included are a driving unit 201, image source panel 203, Polarization Beam Splitter Filter (PBSF) 211, mirror 209, a plurality of lenses 213, 215, 217, 221, Fly Eye Lens (FEL) 219, Dichroic filter 227, and Freeform prism Projection Lens (FPL) 223.

The first 207 and second 225 covers provide a space in which the driving unit 201, image source panel 203, PBSF 211, mirror 209, a plurality of lenses 213, 215, 217, 221, FEL 219, and FPL may be installed, and the internal constituting elements are packaged and fixed to either of the side frames 120.

The driving unit 201 may supply a driving signal that controls a video or an image displayed on the image source panel 203 and may be linked to a separate modular driving chip installed inside or outside the optical driving unit 200. The driving unit 201 may be installed in the form of Flexible Printed Circuits Board (FPCB), which may be equipped with heatsink that dissipates heat generated during operation to the outside.

The image source panel 203 may generate an image according to a driving signal provided by the driving unit 201 and emit light according to the generated image. To this purpose, the image source panel 203 may use the Liquid Crystal Display (LCD) or Organic Light Emitting Diode (OLED) panel.

The PBSF 211 may separate light due to the image generated from the image source panel 203 or block or pass part of the light according to a rotation angle. Therefore, for example, if the image light emitted from the image source panel 203 is composed of P wave, which is horizontal light, and S wave, which is vertical light, the PBSF 211 may separate the P and S waves into different light paths or pass the image light of one polarization or block the image light of the other polarization. The PBSF 211 may be provided as a cube type or plate type in one embodiment.

The cube-type PBSF 211 may filter the image light composed of P and S waves and separate them into different light paths while the plate-type PBSF 211 may pass the image light of one of the P and S waves but block the image light of the other polarization.

The mirror 209 reflects the image light separated from polarization by the PBSF 211 to collect the polarized image light again and let the collected image light incident on a plurality of lenses 213, 215, 217, 221.

The plurality of lenses 213, 215, 217, 221 may include convex and concave lenses and for example, may include I-type lenses and C-type lenses. The plurality of lenses 213, 215, 217, 221 repeat diffusion and convergence of image light incident on the lenses, thereby improving straightness of the image light rays.

The FEL 219 may receive the image light which has passed the plurality of lenses 213, 215, 217, 221 and emit the image light so as to improve illuminance uniformity and extend the area exhibiting uniform illuminance due to the image light.

The dichroic filter 227 may include a plurality of films or lenses and pass light of a specific range of wavelengths from the image light incoming from the FEL 219 but reflect light not belonging to the specific range of wavelengths, thereby adjusting saturation of color of the image light. The image light which has passed the dichroic filter 227 may pass through the FPL 223 and be emitted to the display unit 300.

The display unit 300 may receive the image light emitted from the optical driving unit 200 and emit the incident image light to the direction in which the user's eyes are located.

Meanwhile, in addition to the constituting elements described above, the electronic device may include one or more image capture means (not shown). The image capture means, being disposed close to at least one of left and right eyes, may capture the image of the front area. Or the image capture means may be disposed so as to capture the image of the side/rear area.

Since the image capture means is disposed close to the eye, the image capture means may obtain the image of a real world seen by the user. The image capture means may be installed at the frame 100 or arranged in plural numbers to obtain stereoscopic images.

The electronic device may provide a user input unit 130 manipulated to receive control commands. The user input unit 130 may adopt various methods including a tactile manner in which the user operates the user input unit by sensing a tactile stimulus from a touch or push motion, gesture manner in which the user input unit recognizes the hand motion of the user without a direct touch thereon, or a manner in which the user input unit recognizes a voice command. The present figure illustrates a case where the user input unit 130 is installed at the frame 100.

Also, the electronic device may be equipped with a microphone which receives a sound and converts the received sound to electrical voice data and a sound output unit 140 that outputs a sound. The sound output unit 140 may be configured to transfer a sound through an ordinary sound output scheme or bone conduction scheme. When the sound output unit 140 is configured to operate according to the bone conduction scheme, the sound output unit 140 is fit to the head when the user wears the electronic device and transmits sound by vibrating the skull.

In what follows, various forms of the display unit 300 and various methods for emitting incident image light rays will be described.

FIGS. 7A, 7B, 8A, 8B, 8C, 8D, 8E, 8F, 9A, 9B, 9C, 9D, 10A, 10B, 10C, 10D, 11A, 11B, 11C, 12 and 13 illustrate various display methods applicable to the display unit 300 according to one embodiment of the present invention.

Figure 7A:
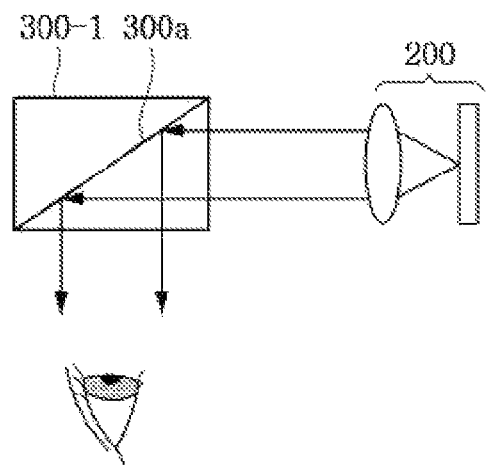
FIGS. 7A, 7B, 8A, 8B, 8C, 8D, 8E, 8F, 9A, 9B, 9C, 9D, 10A, 10B, 10C, 10D, 11A, 11B, 11C, 12 and 13 illustrate various display methods applicable to a display unit according to one embodiment of the present invention.
Figure 7B:
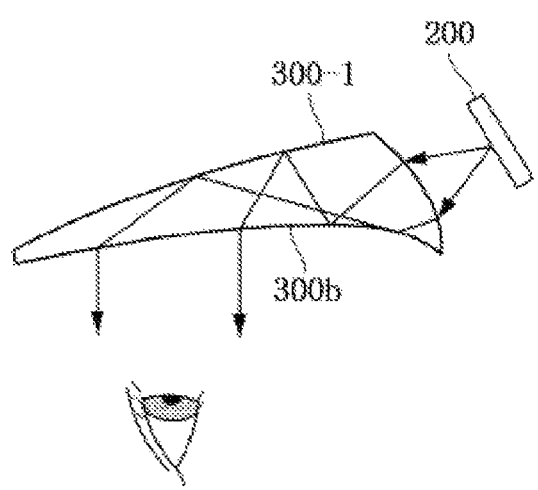
Figure 11A:
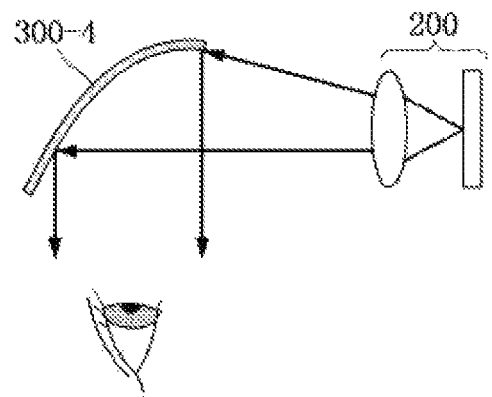
Figure 11B:
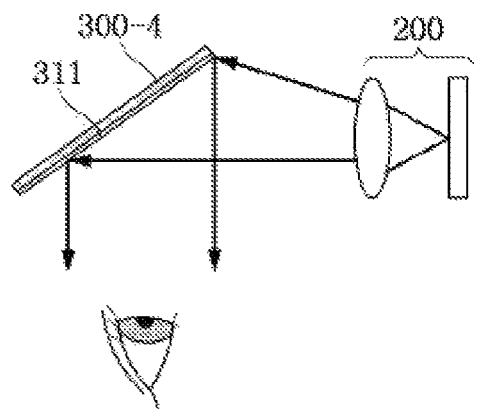
Figure 11C:
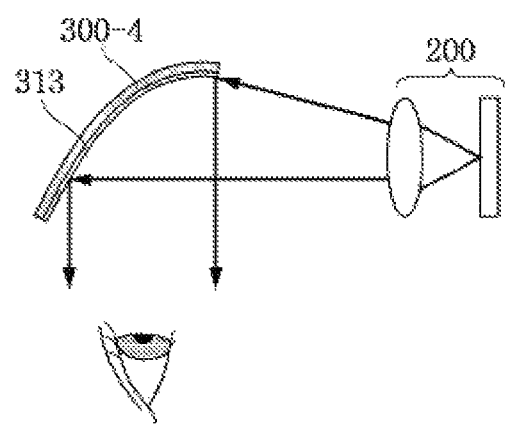
Figure 12:
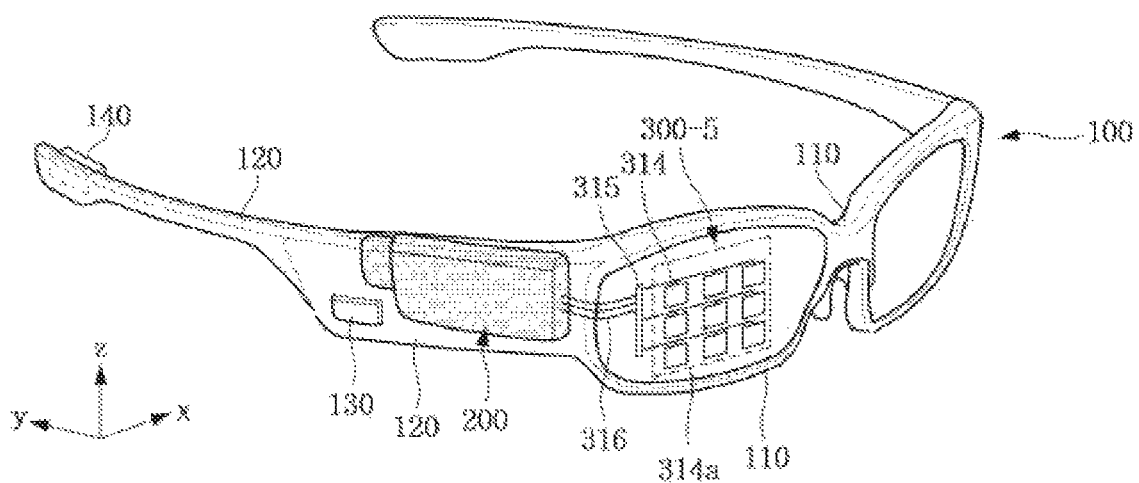
Figure 13:
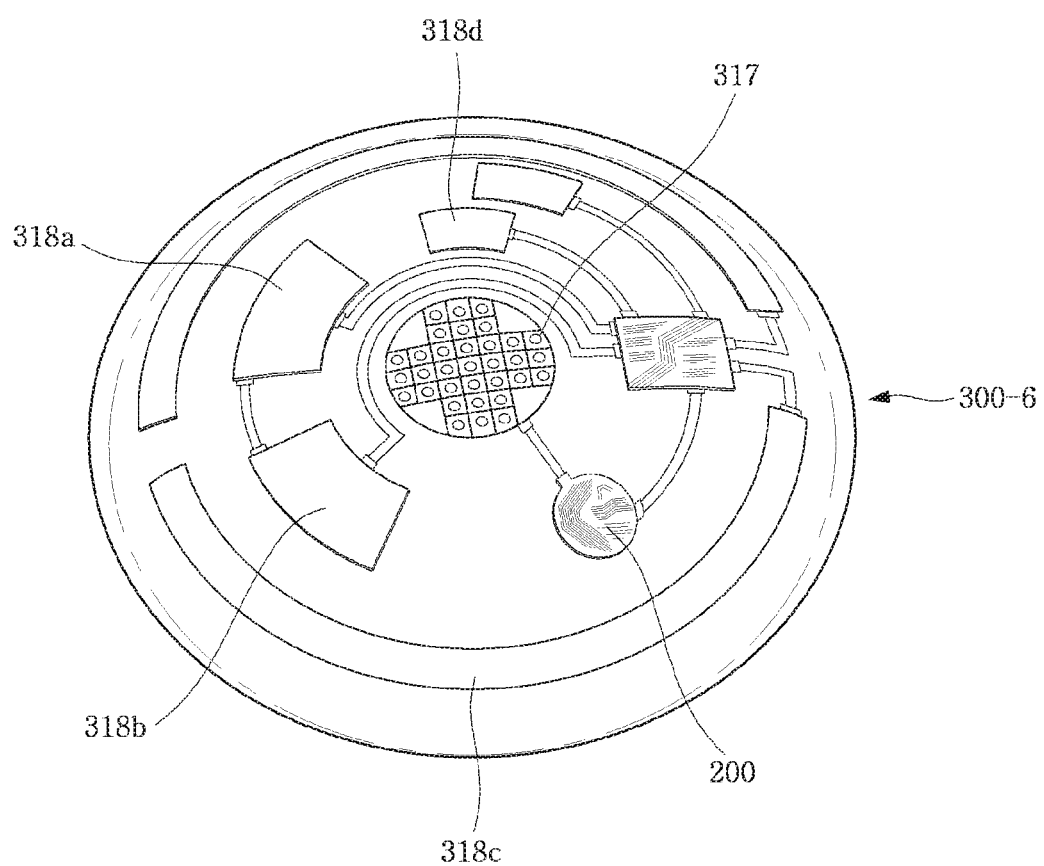

More specifically, FIGS. 7A and 7B illustrate one embodiment of a prism-type optical element; FIGS. 8A, 8B, 8C, 8D, 8E and 8F illustrate one embodiment of a waveguide-type optical element; FIGS. 9A, 9B, 9C, 9D, 10A, 10B, 10C and 10D illustrate one embodiment of a pin mirror-type optical element; and FIGS. 11A, 11B and 11C illustrate one embodiment of a surface reflection-type optical element. And FIG. 12 illustrates one embodiment of a micro-LED type optical element, and FIG. 13 illustrates one embodiment of a display unit used for contact lenses.

As shown in FIGS. 7A and 7B, the display unit 300-1 according to one embodiment of the present invention may use a prism-type optical element.

In one embodiment, as shown in FIG. 7A, a prism-type optical element may use a flat-type glass optical element where the surface 300a on which image light rays are incident and from which the image light rays are emitted is planar or as shown in FIG. 7B, may use a freeform glass optical element where the surface 300b from which the image light rays are emitted is formed by a curved surface without a fixed radius of curvature.

The flat-type glass optical element may receive the image light generated by the optical driving unit 200 through the flat side surface, reflect the received image light by using the total reflection mirror 300a installed inside and emit the reflected image light toward the user. Here, laser is used to form the total reflection mirror 300a installed inside the flat type glass optical element.

The freeform glass optical element is formed so that its thickness becomes thinner as it moves away from the surface on which light is incident, receives image light generated by the optical driving unit 200 through a side surface having a finite radius of curvature, totally reflects the received image light, and emits the reflected light toward the user.

As shown in FIGS. 8A, 8B, 8C, 8D, 8E and 8F, the display unit 300-2 according to another embodiment of the present invention may use a waveguide-type optical element or light guide optical element (LOE).

Figure 8A:
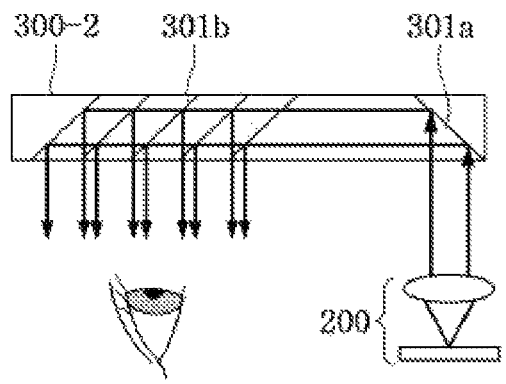
Figure 8B:
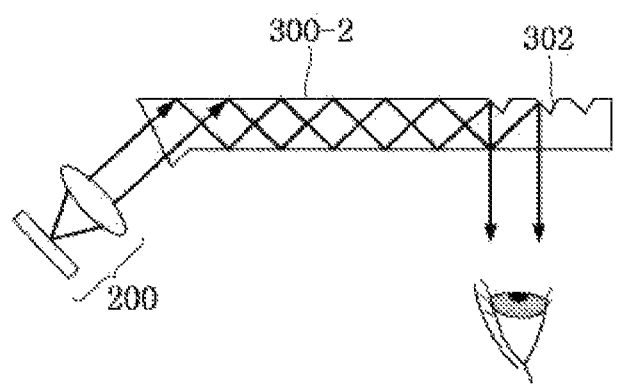
Figure 8C:
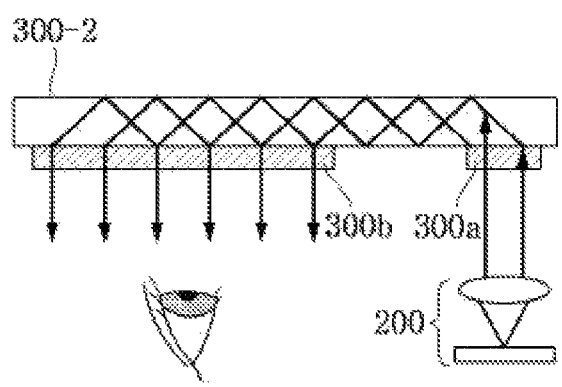
Figure 8D:
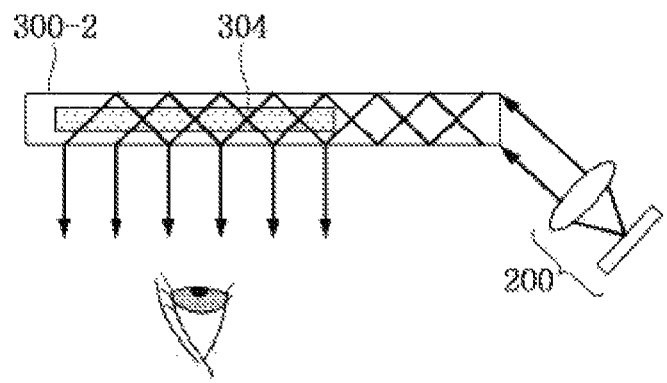
Figure 8E:
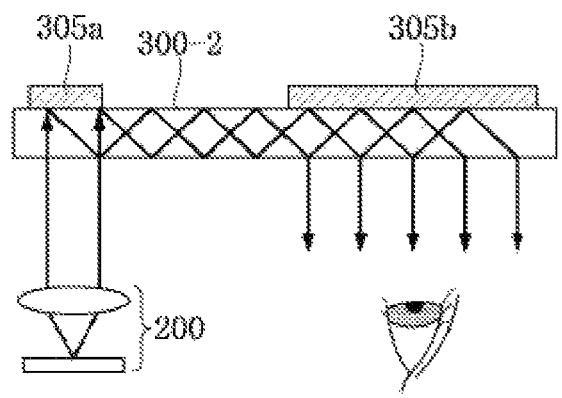
Figure 8F:
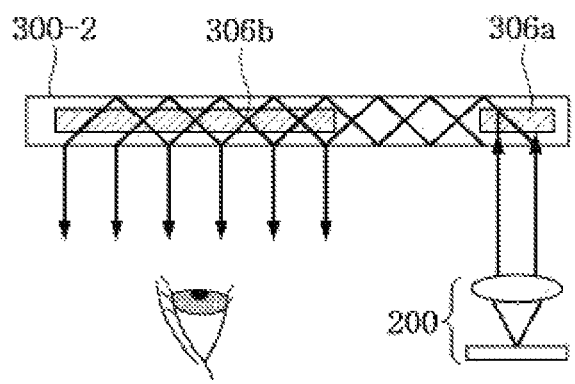

As one embodiment, the waveguide or light guide-type optical element may be implemented by using a segmented beam splitter-type glass optical element as shown in FIG. 8A, saw tooth prism-type glass optical element as shown in FIG. B, glass optical element having a diffractive optical element (DOE) as shown in FIG. 8C, glass optical element having a hologram optical element (HOE) as shown in FIG. 8D, glass optical element having a passive grating as shown in FIG. 8E, and glass optical element having an active grating as shown in FIG. 8F.

As shown in FIG. 8A, the segmented beam splitter-type glass optical element may have a total reflection mirror 301a where an optical image is incident and a segmented beam splitter 301b where an optical image is emitted.

Accordingly, the optical image generated by the optical driving unit 200 is totally reflected by the total reflection mirror 301a inside the glass optical element, and the totally reflected optical image is partially separated and emitted by the partial reflection mirror 301b and eventually perceived by the user while being guided along the longitudinal direction of the glass.

In the case of the saw tooth prism-type glass optical element as shown in FIG. 8B, the optical image generated by the optical driving unit 200 is incident on the side surface of the glass in the oblique direction and totally reflected into the inside of the glass, emitted to the outside of the glass by the saw tooth-shaped uneven structure 302 formed where the optical image is emitted, and eventually perceived by the user.

The glass optical element having a Diffractive Optical Element (DOE) as shown in FIG. 8C may have a first diffraction unit 303a on the surface of the part on which the optical image is incident and a second diffraction unit 303b on the surface of the part from which the optical image is emitted. The first and second diffraction units 303a, 303b may be provided in a way that a specific pattern is patterned on the surface of the glass or a separate diffraction film is attached thereon.

Accordingly, the optical image generated by the optical driving unit 200 is diffracted as it is incident through the first diffraction unit 303a, guided along the longitudinal direction of the glass while being totally reflected, emitted through the second diffraction unit 303b, and eventually perceived by the user.

The glass optical element having a Hologram Optical Element (HOE) as shown in FIG. 8D may have an out-coupler 304 inside the glass from which an optical image is emitted. Accordingly, the optical image is incoming from the optical driving unit 200 in the oblique direction through the side surface of the glass, guided along the longitudinal direction of the glass by being totally reflected, emitted by the out-coupler 304, and eventually perceived by the user. The structure of the HOE may be modified gradually to be further divided into the structure having a passive grating and the structure having an active grating.

The glass optical element having a passive grating as shown in FIG. 8E may have an in-coupler 305a on the opposite surface of the glass surface on which the optical image is incident and an out-coupler 305b on the opposite surface of the glass surface from which the optical image is emitted. Here, the in-coupler 305a and the out-coupler 305b may be provided in the form of film having a passive grating.

Accordingly, the optical image incident on the glass surface at the light-incident side of the glass is totally reflected by the in-coupler 305a installed on the opposite surface, guided along the longitudinal direction of the glass, emitted through the opposite surface of the glass by the out-coupler 305b, and eventually perceived by the user.

The glass optical element having an active grating as shown in FIG. 8F may have an in-coupler 306a formed as an active grating inside the glass through which an optical image is incoming and an out-coupler 306b formed as an active grating inside the glass from which the optical image is emitted.

Accordingly, the optical image incident on the glass is totally reflected by the in-coupler 306a, guided in the longitudinal direction of the glass, emitted to the outside of the glass by the out-coupler 306b, and eventually perceived by the user.

The display unit 300-3 according to another embodiment of the present invention may use a pin mirror-type optical element.

The pinhole effect is so called because the hole through which an object is seen is like the one made with the point of a pin and refers to the effect of making an object look more clearly as light is passed through a small hole. This effect results from the nature of light due to refraction of light, and the light passing through the pinhole deepens the depth of field (DOF), which makes the image formed on the retina more vivid.

In what follows, an embodiment for using a pin mirror-type optical element will be described with reference to FIGS. 9A, 9B, 9C, 9D, 10A, 10B, 10C and 10D.

Figure 9A:
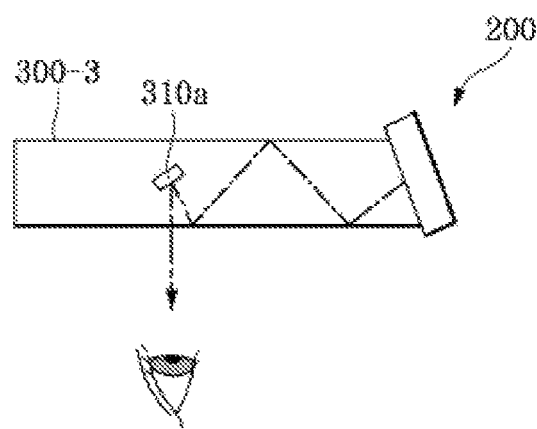

Referring to FIG. 9A, the pinhole mirror 310a may be provided on the path of incident light within the display unit 300-3 and reflect the incident light toward the user's eye. More specifically, the pinhole mirror 310a may be disposed between the front surface (outer surface) and the rear surface (inner surface) of the display unit 300-3, and a method for manufacturing the pinhole mirror will be described again later.

The pinhole mirror 310a may be formed to be smaller than the pupil of the eye and to provide a deep depth of field. Therefore, even if the focal length for viewing a real world through the display unit 300-3 is changed, the user may still clearly see the real world by overlapping an augmented reality image provided by the optical driving unit 200 with the image of the real world.

And the display unit 300-3 may provide a path which guides the incident light to the pinhole mirror 310a through internal total reflection.

Figure 9B:
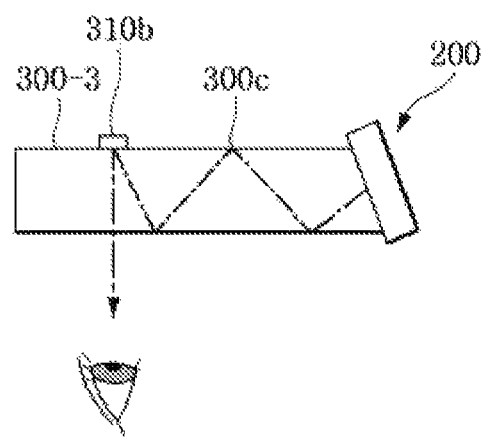

Referring to FIG. 9B, the pinhole mirror 310b may be provided on the surface 300c through which light is totally reflected in the display unit 300-3. Here, the pinhole mirror 310b may have the characteristic of a prism that changes the path of external light according to the user's eyes. For example, the pinhole mirror 310b may be fabricated as film-type and attached to the display unit 300-3, in which case the process for manufacturing the pinhole mirror is made easy.

The display unit 300-3 may guide the incident light incoming from the optical driving unit 200 through internal total reflection, the light incident by total reflection may be reflected by the pinhole mirror 310b installed on the surface on which external light is incident, and the reflected light may pass through the display unit 300-3 to reach the user's eyes.

Figure 9C:
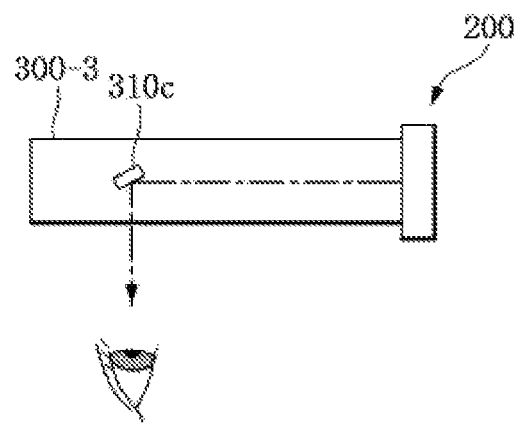

Referring to FIG. 9C, the incident light illuminated by the optical driving unit 200 may be reflected by the pinhole mirror 310c directly without internal total reflection within the display unit 300-3 and reach the user's eyes. This structure is convenient for the manufacturing process in that augmented reality may be provided irrespective of the shape of the surface through which external light passes within the display unit 300-3.

Figure 9D:
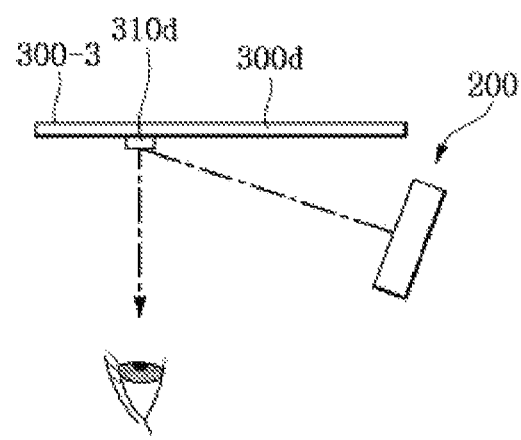

Referring to FIG. 9D, the light illuminated by the optical driving unit 200 may reach the user's eyes by being reflected within the display unit 300-3 by the pinhole mirror 310d installed on the surface 300d from which external light is emitted. The optical driving unit 200 is configured to illuminate light at the position separated from the surface of the display unit 300-3 in the direction of the rear surface and illuminate light toward the surface 300d from which external light is emitted within the display unit 300-3. The present embodiment may be applied easily when thickness of the display unit 300-3 is not sufficient to accommodate the light illuminated by the optical driving unit 200. Also, the present embodiment may be advantageous for manufacturing in that it may be applied irrespective of the surface shape of the display unit 300-3, and the pinhole mirror 310d may be manufactured in a film shape.

Meanwhile, the pinhole mirror 310 may be provided in plural numbers in an array pattern.

FIGS. 10A, 10B, 10C and 10D illustrate the shape of a pinhole mirror and structure of an array pattern according to one embodiment of the present invention.

Referring to the figure, the pinhole mirror 310 may be fabricated in a polygonal structure including a square or rectangular shape. Here, the length (diagonal length) of a longer axis of the pinhole mirror 310 may have a positive square root of the product of the focal length and wavelength of light illuminated in the display unit 300-3.

A plurality of pinhole mirrors 310 are disposed in parallel, being separated from each other, to form an array pattern. The array pattern may form a line pattern or lattice pattern.

Figure 10A:
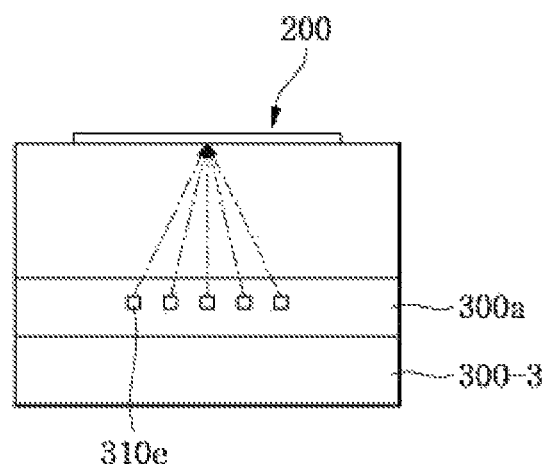
Figure 10B:
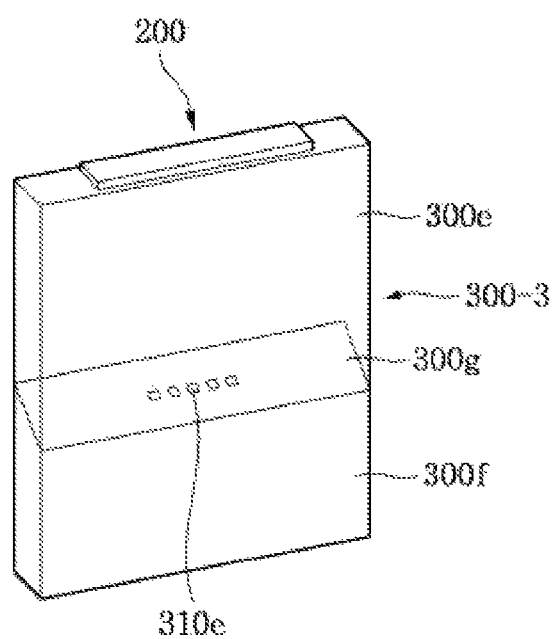
Figure 10C:
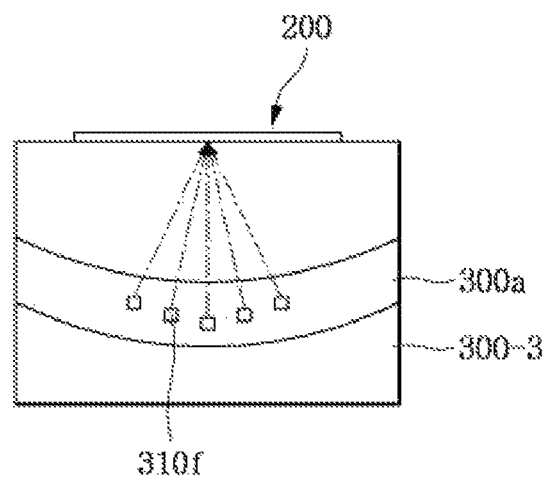
Figure 10D:
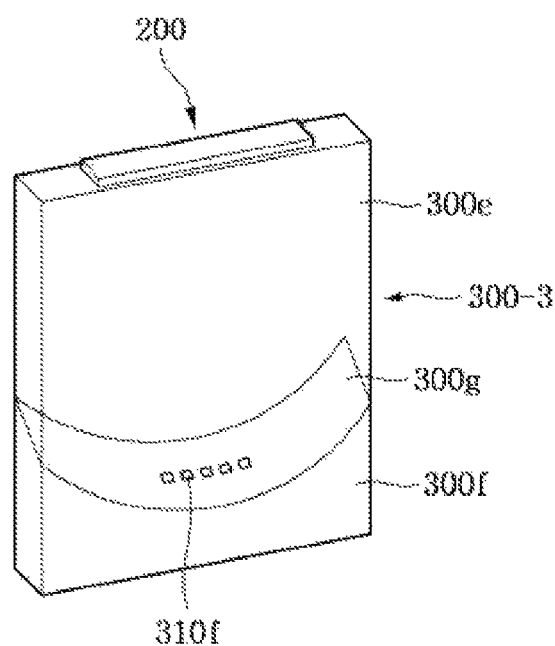

FIGS. 10A and 10B illustrate the Flat Pin Mirror scheme, and FIGS. 10C and 10D illustrate the freeform Pin Mirror scheme.

When the pinhole mirror 310 is installed inside the display unit 300-3, the first glass 300e and the second glass 300f are combined by an inclined surface 300g disposed being inclined toward the pupil of the eye, and a plurality of pinhole mirrors 310e are disposed on the inclined surface 300g by forming an array pattern.

Referring to FIGS. 10A and 10B, a plurality of pinhole mirrors 310e may be disposed side by side along one direction on the inclined surface 300g and continuously display the augmented reality provided by the optical driving unit 200 on the image of a real world seen through the display unit 300-3 even if the user moves the pupil of the eye.

And referring to FIGS. 10C and 10D, the plurality of pinhole mirrors 310f may form a radial array on the inclined surface 300g provided as a curved surface.

Since the plurality of pinhole mirrors 300f are disposed along the radial array, the pinhole mirror 310f at the edge in the figure is disposed at the highest position, and the pinhole mirror 310f in the middle thereof is disposed at the lowest position, the path of a beam emitted by the optical driving unit 200 may be matched to each pinhole mirror.

As described above, by disposing a plurality of pinhole arrays 310f along the radial array, the double image problem of augmented reality provided by the optical driving unit 200 due to the path difference of light may be resolved.

Similarly, lenses may be attached on the rear surface of the display unit 300-3 to compensate for the path difference of the light reflected from the plurality of pinhole mirrors 310e disposed side by side in a row.

The surface reflection-type optical element that may be applied to the display unit 300-4 according to another embodiment of the present invention may employ the freeform combiner method as shown in FIG. 11A, Flat HOE method as shown in FIG. 11B, and freeform HOE method as shown in FIG. 11C.

The surface reflection-type optical element based on the freeform combiner method as shown in FIG. 11A may use freeform combiner glass 300, for which a plurality of flat surfaces having different incidence angles for an optical image are combined to form one glass with a curved surface as a whole to perform the role of a combiner. The freeform combiner glass 300 emits an optical image to the user by making incidence angle of the optical image differ in the respective areas.

The surface reflection-type optical element based on Flat HOE method as shown in FIG. 11B may have a hologram optical element (HOE) 311 coated or patterned on the surface of flat glass, where an optical image emitted by the optical driving unit 200 passes through the HOE 311, reflects from the surface of the glass, again passes through the HOE 311, and is eventually emitted to the user.

The surface reflection-type optical element based on the freeform HOE method as shown in FIG. 11C may have a HOE 313 coated or patterned on the surface of freeform glass, where the operating principles may be the same as described with reference to FIG. 11B.

In addition, a display unit 300-5 employing micro LED as shown in FIG. 12 and a display unit 300-6 employing a contact lens as shown in FIG. 13 may also be used.

Referring to FIG. 12, the optical element of the display unit 300-5 may include a Liquid Crystal on Silicon (LCoS) element, Liquid Crystal Display (LCD) element, Organic Light Emitting Diode (OLED) display element, and Digital Micromirror Device (DMD); and the optical element may further include a next-generation display element such as Micro LED and Quantum Dot (QD) LED.

The image data generated by the optical driving unit 200 to correspond to the augmented reality image is transmitted to the display unit 300-5 along a conductive input line 316, and the display unit 300-5 may convert the image signal to light through a plurality of optical elements 314 (for example, microLED) and emits the converted light to the user's eye.

The plurality of optical elements 314 are disposed in a lattice structure (for example, 100×100) to form a display area 314a. The user may see the augmented reality through the display area 314a within the display unit 300-5. And the plurality of optical elements 314 may be disposed on a transparent substrate.

The image signal generated by the optical driving unit 200 is sent to an image split circuit 315 provided at one side of the display unit 300-5; the image split circuit 315 is divided into a plurality of branches, where the image signal is further sent to an optical element 314 disposed at each branch. At this time, the image split circuit 315 may be located outside the field of view of the user so as to minimize gaze interference.

Referring to FIG. 13, the display unit 300-5 may comprise a contact lens. A contact lens 300-5 on which augmented reality may be displayed is also called a smart contact lens. The smart contact lens 300-5 may have a plurality of optical elements 317 in a lattice structure at the center of the smart contact lens.

The smart contact lens 300-5 may include a solar cell 318a, battery 318b, optical driving unit 200, antenna 318c, and sensor 318d in addition to the optical element 317. For example, the sensor 318d may check the blood sugar level in the tear, and the optical driving unit 200 may process the signal of the sensor 318d and display the blood sugar level in the form of augmented reality through the optical element 317 so that the user may check the blood sugar level in real-time.

As described above, the display unit 300 according to one embodiment of the present invention may be implemented by using one of the prism-type optical element, waveguide-type optical element, light guide optical element (LOE), pin mirror-type optical element, or surface reflection-type optical element. In addition to the above, an optical element that may be applied to the display unit 300 according to one embodiment of the present invention may include a retina scan method.

Figure 14:
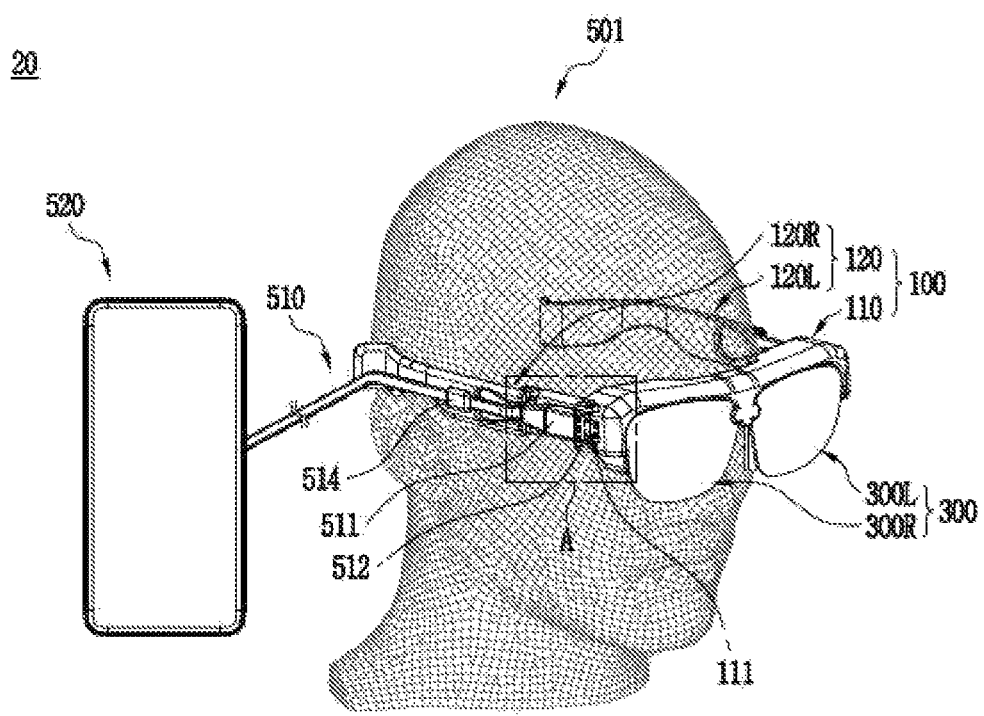
FIG. 14 illustrates a configuration of an electronic device related to the present invention.

FIG. 14 illustrates a configuration of an electronic device 20 related to the present invention.

Electronic device 20 according to the present invention may have a feature of XR device 13 described above, that is, an extended reality electronic device, in particular, smart glasses. However, features of other electronic devices may be applied organically or in combination as long as they do not contradict.

As described above, electronic device 20 includes a frame 100, a driving unit 200, and a display unit 300. Driving unit 200 includes an image source panel configured to form image light corresponding to the content to be output, and the image light formed in driving unit 200 is visible to a user through display unit 300. Driving unit 200 and display unit 300 are provided to frame 100.

Display unit 300 may be provided separately from the spectacle lenses of the glasses type electronic device as illustrated in FIG. 5, or may be provided in the form of the spectacle lenses as illustrated in FIG. 14. In the latter case, display unit 300 may provide the user with a real object and an XR object (content) together. Display units 300L and 300R may be provided only to one side of the left eye and the right eye, or may be provided to both sides.

Driving unit 200 forms the image light corresponding to the content to be output and provides the image light to display unit 300. Therefore, driving unit 200 and display unit 300 may be optically connected, and the specific principle thereof is as described with reference to FIGS. 5 to 12.

Frame 100 is composed of a front frame 110 and a side frame 120.

Front frame 110 locates display unit 300 to be visible to the user. In some cases, front frame 110 may be equipped with an electronic part therein to mount electronic components required for driving, and in some cases, driving unit 200 may be mounted thereto. Front frame 110 may have a shape of a spectacle frame of eyeglasses.

A pair of side frames 120L and 120R are respectively connected to the left and right sides of front frame 110 to fix the electronic device 20 to the head of the user. Side frame 120 may have a shape of a leg of eyeglasses. Pair of side frames 120L and 120R may be vertically connected to a rear surface 1101 of front frame 110.

When electronic device 20 includes all of its own electronic components for driving, electronic device 20 may operate without being connected to an external device 520, but has a disadvantage in that volume and weight are increased. Therefore, electronic device 20 of the present invention may be connected to external device 520 to transmit or receive data or to receive power. Electronic device 20 driven in this manner may omit memory 26 and power supply 28 described with reference to FIG. 2 and use corresponding portions of external device 520 instead.

Electronic device 20 may be electrically connected to external device 520 through a cable 510. Cable 510 may form a data or power transfer path between electronic device 20 and external device 520 (typically external device 520 will provide power to electronic device 20).

Electronic device 20 can include a port 111 to which cable 510 is coupled. Port 111 may be provided only to one side of both sides of front frame 110.

As will be described later, since electronic device 20 of the present invention requires cable 510 to be coupled even when side frame 120 is separated and a head unit 400 is coupled, port 111 is provided to front frame 110.

Figure 15A:
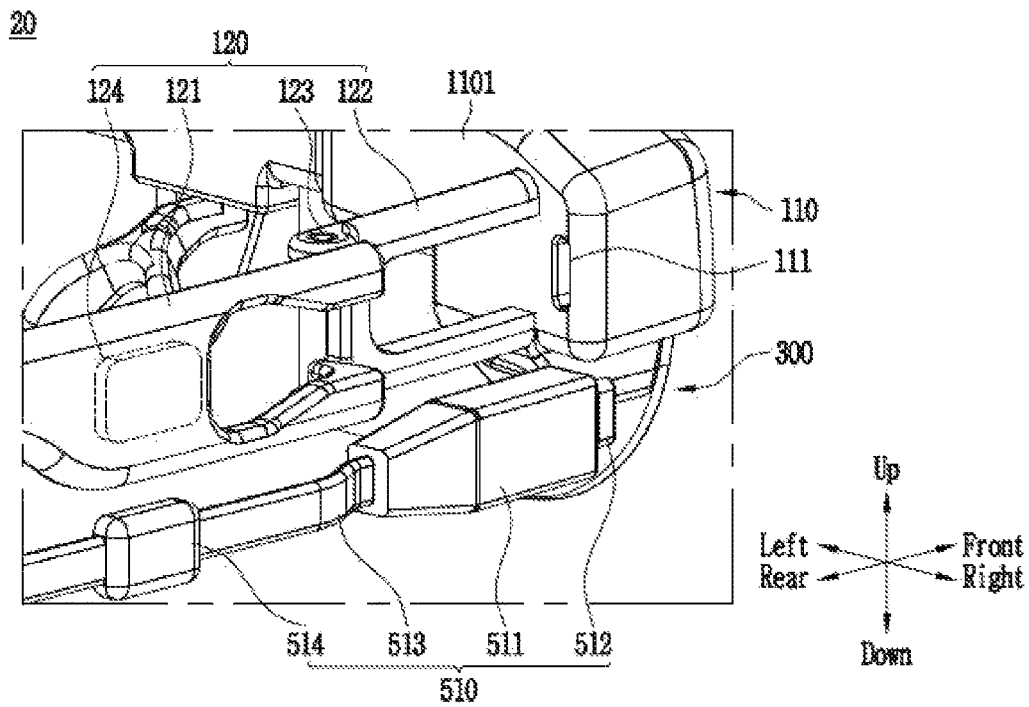
FIGS. 15A and 15B are rear perspective views of the region A of FIG. 14 before and after the cable is coupled, respectively.
Figure 15B:
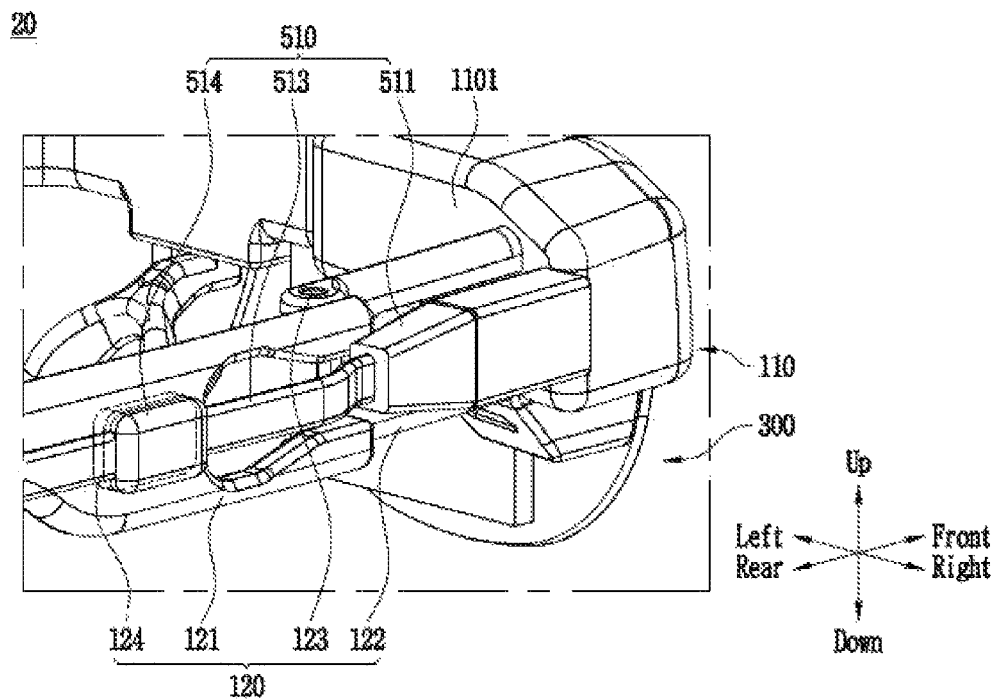
Figure 16:
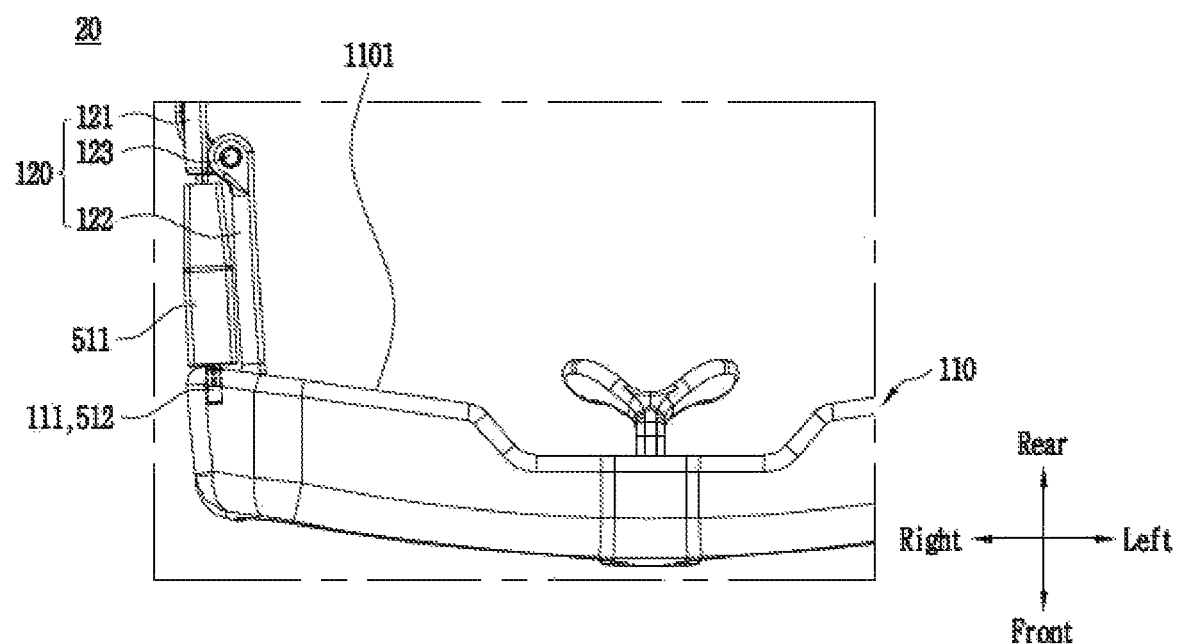
FIG. 16 is a top view of the region A of FIG. 14.

FIGS. 15A and 15B are rear perspective views of the region A of FIG. 14 before and after the cable is coupled, respectively, and FIG. 16 is a top view of the region A of FIG. 14

In particular, port 111 may be provided to the left end or the right end of front frame 110. Port 111 is coupled to the left or right outside of front frame 110 to minimize the possibility of interference between cable 510 and the user's face.

More specifically, port 111 is provided outside of rear surface 1101 of front frame 110 to allow cable 510 to be inserted in front and rear direction. Cable 510 includes a rigid connector 511 and a sheath 513 which surrounds the electric wire, near a terminal 512 inserted into port 111. If cable 510 is inserted in front and rear direction, connector 511 and sheath 513 are provided in the same direction as side frame 120 and do not protrude to the left and right sides of electronic device 20, thereby increasing the sense of unity. In particular, if sheath 513 is provided to closely contact side frame 120, cable 510 may be prevented from being inadvertently separated due to external interference.

In particular, port 111 may be provided outside the connection point at which side frame 120 and front frame 110 are connected to allow cable 510 to be easily coupled or separated from the outside.

Side frame 120 includes a support unit 121 and a connection unit 122.

Support unit 121 refers to a part fixed to the head with close contact in side frame 120. Support unit 121 may be manufactured in a straight shape or a curved ergonomic shape.

Connection unit 122 connects support unit 121 and front frame 110. Connection unit 122 forms a step recessed inward from support unit 121. In this recessed area, connector 511 is positioned when cable 510 is coupled to port 111. Since connector 511 is thicker and larger in volume than sheath 513, connector 511 is protected from external damage by minimizing the protrusion of connector 511 to the outside by securing a space in which connector 511 is located and sheath 513 may be provided in close contact with support unit 121.

Support unit 121 and cable 510 may be provided with magnets for generating mutual attraction to make them in close contact to be fixed with each other. When a side frame magnet 124 is provided to support unit 121 and a mating magnet 514 is provided to corresponding location of cable 510, cable 510 is in close contact with support unit 121 and fixed by mutual attraction. Accordingly, cable 510 can maintain a stable state without being jammed even in a connected state.

Support unit 121 and connection unit 122 may be manufactured, in particular, as separate pieces and fastened by a hinge unit 123. Support unit 121 may be pivoted by hinge unit 123 to be folded and stored when electronic device 20 is not in use.

Figure 17:
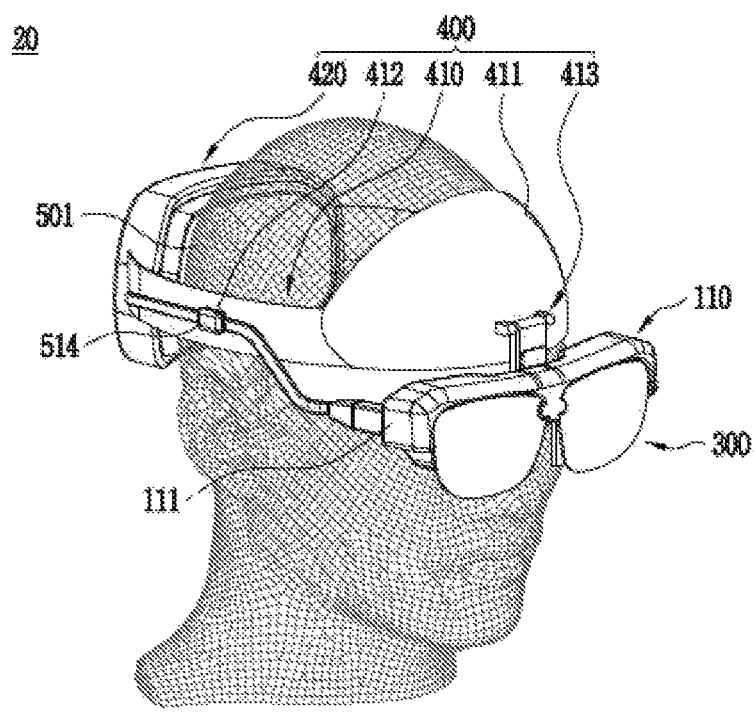
FIG. 17 illustrates another configuration of an electronic device related to the present invention.

FIG. 17 illustrates another configuration of an electronic device 20 related to the present invention.

As described above, electronic device 20 of the present invention may be implemented not only as the glasses type as shown in FIG. 14 but also as a band-fixing type (hereinafter referred to as a headband type) to which the head unit is coupled.

When electronic device 20 is provided as the glasses type, it is advantageous in portability but there is a limitation in the configuration that can be mounted, which is disadvantageous to maintain power and it can be driven only when it is connected to an external device as described above. On the other hand, if it is changed to the headband type, both hands become free and stable driving is possible because there is no need to connect an external device.

The headband type is fixed to head 501 by a support band 410 instead of side frame 120. Therefore, it is possible to withstand more loads on head 501, and the coupling is maintained stable. Accordingly, a separate head unit 400 may be combined instead of a handheld external device 520.

When head unit 400 is coupled by support band 410, existing side frame 120 becomes unnecessary and it may rather interfere with the coupling and fixing of support band 410. Therefore, electronic device 20 of the present invention proposes a structure that can separate side frame 120 if needed.

Figure 18A:
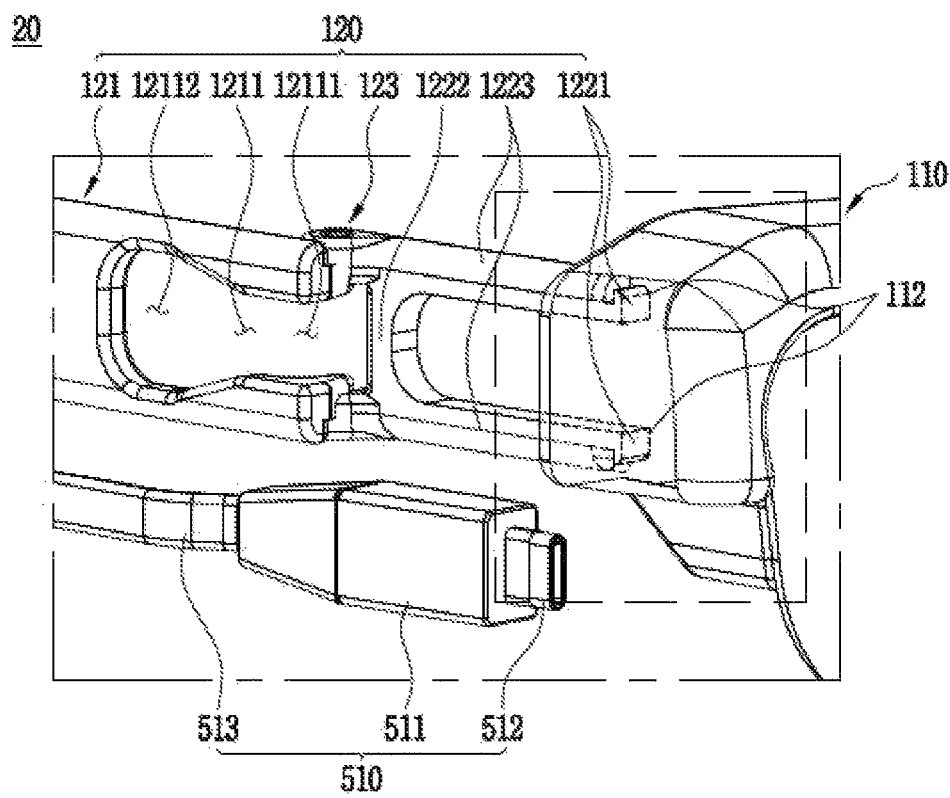
FIG. 18A illustrates a partial region of electronic device related to the present invention.
Figure 18B:
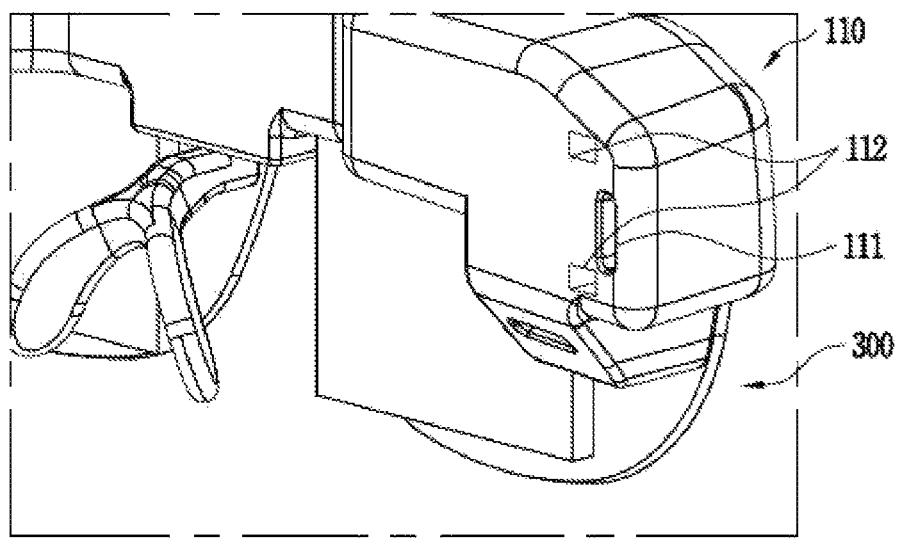
FIG. 18B illustrates the partial region of FIG. 18A viewed from another direction.

FIG. 18A illustrates a partial region of electronic device 20 related to the present invention, and FIG. 18B illustrates the partial region of FIG. 18A viewed from another direction.

Side frame 120 is hook-coupled with front frame 110 and may be separated as needed. A hook 1221 may be formed in side frame 120, and a hook groove 112 may be formed in front frame 110. Hook 1221 may be provided in a pair of two facing outward in the vertical direction, and hook 1221 of this type may be provided to the side of side frame 120 so that side frame 120 can be easily separated from front frame 110.

In order to implement a structure of the pair of hooks 1221 provided in the vertical direction, connection unit 122 may include a support end 1222 formed in the vertical direction. A pair of cantilevers 1223 may be formed to extend in the horizontal direction from the upper side and the lower side of support end 1222 to form hook 1221 at the outer end. Accordingly, the user may press pair of cantilever 1223 from the outside to separate hook 1221 from hook groove 112.

Support unit 121 may include a cable seating unit 1211 forming an open area of 'c' shape in an area adjacent to connection unit 122. Cable seating unit 1211 allows cable 510 (see FIG. 3) to extend smoothly without sudden bending and to closely contact the side of support unit 121. In addition, jamming of cable 510 is minimized by retracting the area where cable 510 sags backward.

In particular, cable seating unit 1211 may have the shape of a bottle in which an inlet area 12111 is narrow and a seating area 12112 is wide. It is to prevent cable 510 from being easily separated from cable seating unit 1211 by an unintentional external force when cable 510 is seated on cable seating unit 1211.

Referring back to FIG. 17, front frame 110 may be separated from side frame 120 (see FIG. 14) and coupled to head unit 400 through support band 410. Side frame, which is implemented as the glasses type, has a weight-constraint for a comfortable fit, while the headband type is supported over a large area of head 501 so that the electronic device 20 may have an electronic part in itself without a need to be connected to an external device. Therefore, the electric part may include most of the configuration of FIG. 2 described above.

Support band 410 surrounds the circumference of head 501 while being coupled with front frame 110 so that front frame 110 can be fixed to head 501. Support band 410 may be implemented in the form of a band having elasticity, or it may be provided in the form of a strap of an adjustable length.

A support bracket 411 fixes front frame 110 to head 501 together with support band 410. Support bracket 411 forms a curved surface corresponding to the shape of a region of head 501 so that a relatively large area supports the head, thereby reducing the pressure caused by the load of electronic device 20. Support bracket 411 may be independently coupled to front frame 110 through a fastening unit 413 and simultaneously connected to support band 410.

A main body 420 forms an electronic part, and cable 510 may electrically connect main body 420 and front frame 110.

Main body 420 is electrically connected to front frame 110, driving unit 200, and display unit 300 through cable 510.

A band magnet 412 is provided to support band 410 and a mating magnet 514 is provided to cable 510, respectively, of which mutual attraction makes cable 510 to be closely fixed to support band 410 and prevents from being jammed.

Particular embodiments or other embodiments of the present invention described above are not mutually exclusive to each other or distinguishable from each other. Individual structures or functions of particular embodiments or other embodiments of the present invention described above may be used in parallel therewith or in combination thereof.

For example, it means that structure A described with reference to a specific embodiment and/or figure and structure B described with reference to other embodiment and/or figure may be combined together. In other words, even if a combination of two different structures is not explicitly indicated, it should be understood that combination thereof is possible unless otherwise stated as impossible.

The detailed descriptions above should be regarded as being illustrative rather than restrictive in every aspect. The technical scope of the present invention should be determined by a reasonable interpretation of the appended claims, and all of the modifications that fall within an equivalent scope of the present invention belong to the technical scope of the present invention.

The advantageous effects of the electronic device according to the present invention will be described below.

According to at least one of the embodiments of the present invention, the interference of the cable can be minimized to prevent the risk of unintentionally disconnecting or damaging the cable.

Further, according to at least one of the embodiments of the present invention, there is an advantage that the electronic device can be used either in a light-weight, portable manner or a high performance manner as needed.

In addition, according to at least one of the embodiments of the present invention, there is an advantage that the side frames (legs of glasses) detachably coupled to the front frame can be easily separated or combined.

Further scope of the applicability of the present invention will become apparent from the following detailed description. However, various changes and modifications within the spirit and scope of the present invention can be clearly understood by those skilled in the art, and therefore, specific embodiments, such as detailed descriptions and preferred embodiments of the present invention, should be construed that they are given by way of example only.

What is claimed is:

1. An electronic device comprising:
   a driving unit including an image source panel configured to form image light;
   a display unit configured to make the image light formed by the driving unit visible to a user; and
   a frame provided with the driving unit and the display unit, wherein
   the frame includes:
      a front frame configured to locate the display unit to be seen by the user;
      a pair of side frames connected to left and right sides of the front frame, respectively; and
      a port formed at an outer side of at least one point on which the side frame and the front frame are connected so that a cable for transferring data or power from an external device may be attached or detached, and
      the side frame includes:
         a support unit configured to support a head; and
         a connection unit configured to connect the support unit and the front frame and having a step recessed inward from the support unit to secure a space for a connector of a cable.

2. The electronic device of claim 1, further comprising a side frame magnet provided to the support unit and configured to generate mutual attraction with a magnet provided to the cable.

3. The electronic device of claim 1, wherein the support unit and the connection unit are manufactured as separate pieces and hinge-coupled to pivot mutually.

4. The electronic device of claim 1, further comprising a hook unit to which the side frame and the front frame are provided detachably.

5. The electronic device of claim 4, wherein a hook of the hook unit is formed in the side frame, and the connection unit includes:
   a support end formed in a vertical direction; and
   a pair of parallel cantilevers formed extending in a horizontal direction from an upper side and a lower side of the support end, respectively, outer ends of which form the hook that is fastened to a hook groove of the front frame.

6. The electronic device of claim 4, further comprising a head unit selectively coupled to the front frame to seat on the head of the user when coupled and configured to form an electronic part.

7. The electronic device of claim 6, wherein the head unit includes:
   a support band surrounding the head to fix the head unit to the head;
   a support bracket connected with the support band to support a region of the head; and
   a main body connected with the support band to form the electronic part.

8. The electronic device of claim 7, further comprising a band magnet provided to the support band to generate mutual attraction with the magnet provided to the cable connecting the main body and the driving unit through the port.

9. The electronic device of claim 7, wherein the support bracket includes a fastening unit configured to be fastened to the front frame, and the main body includes a memory and a power supply and is located corresponding to back of the user's head.

10. The electronic device of claim 1, wherein the support unit includes a cable seating unit forming an open area of 'c' shape at an end of the connection unit side.

* * * * *